United States Patent
Christensen

(10) Patent No.: US 9,252,889 B2
(45) Date of Patent: Feb. 2, 2016

(54) FAST OPTICAL RECEIVER

(71) Applicant: MELLANOX TECHNOLOGIES DENMARK ApS, Roskilde (DK)

(72) Inventor: Steen Bak Christensen, Roskilde (DK)

(73) Assignee: MELLANOX TECHNOLOGIES DENMARK APS, Roskilde (DK)

( * ) Notice: Subject to any disclaimer, the term of this patent is extended or adjusted under 35 U.S.C. 154(b) by 0 days.

(21) Appl. No.: 14/355,979

(22) PCT Filed: Nov. 5, 2012

(86) PCT No.: PCT/DK2012/050406
§ 371 (c)(1),
(2) Date: May 2, 2014

(87) PCT Pub. No.: WO2013/064158
PCT Pub. Date: May 10, 2013

(65) Prior Publication Data
US 2014/0301741 A1    Oct. 9, 2014

Related U.S. Application Data

(60) Provisional application No. 61/555,236, filed on Nov. 3, 2011.

(51) Int. Cl.
*H04B 10/54* (2013.01)
*H04B 10/69* (2013.01)
*H04B 10/079* (2013.01)

(52) U.S. Cl.
CPC .......... *H04B 10/697* (2013.01); *H04B 10/0795* (2013.01); *H04B 10/541* (2013.01); *H04B 10/695* (2013.01)

(58) Field of Classification Search
CPC .. H04B 10/541; H04B 10/695; H04B 10/697; H04B 10/0795
USPC .......................... 398/183, 186, 192, 193, 198
See application file for complete search history.

(56) References Cited

U.S. PATENT DOCUMENTS 5,025,456 A    6/1991  Ota et al.
5,371,763 A   12/1994  Ota et al.
(Continued)

OTHER PUBLICATIONS

Yamada, K., Silicon Photonics Wire Waveguides: Fundamentals and Applications, Topics in Applied Physics 119, pp. 1-29, Springer-Verlag (2011).

*Primary Examiner* — Dalzid Singh
(74) *Attorney, Agent, or Firm* — Buchanan Ingersoll & Rooney PC

(57) ABSTRACT

A method for optical transmission of high speed data and an optical receiver for receiving such high speed data is provided. The method includes transmitting an optical signal having a first logic-high and first logic-low defining a first modulation amplitude that is sub-band modulated with a toggling signal having a first toggling amplitude with a first modulation index, receiving the optical signal with an optical receiver circuit and converting the optical signal to an intermediate electrical signal, IES, having: a second logic-high and a second logic-low defining a second modulation amplitude, and a second toggling amplitude having a second modulation index, providing a decision threshold relative to the IES as a function of the second modulation amplitude, and adjusting the threshold by determining the second toggling amplitude and adjusting the threshold relative to the IES based on proportionality between the second toggling amplitude and the second modulation amplitude.z.

54 Claims, 8 Drawing Sheets

(56) References Cited

U.S. PATENT DOCUMENTS

| | | | |
|---|---|---|---|
| 5,430,766 A | 7/1995 | Ota et al. | |
| 6,563,623 B1 | 5/2003 | Penninckx et al. | |
| 7,016,659 B1 | 3/2006 | Dorrough et al. | |
| 7,116,917 B2 * | 10/2006 | Miyamoto et al. | 398/185 |
| 8,705,985 B2 | 4/2014 | Christensen | |
| 2004/0165893 A1 * | 8/2004 | Winzer | 398/161 |
| 2006/0245763 A1 * | 11/2006 | Ishida et al. | 398/186 |
| 2008/0240726 A1 * | 10/2008 | Wang et al. | 398/141 |
| 2011/0020006 A1 | 1/2011 | Christensen | |
| 2011/0200337 A1 * | 8/2011 | Karout et al. | 398/141 |
| 2013/0016965 A1 | 1/2013 | Christensen | |

* cited by examiner

FAST OPTICAL RECEIVER

TECHNICAL FIELD

The invention relates to a method for optical transmission of high speed data and an optical receiver suitable for receiving such high speed data for example in an optical interconnect.

BACKGROUND ART

A requirement for conventional binary data transmission is the establishment of a well-defined logic threshold. Metallic wired systems use pre-defined dc logic levels for this purpose. This is unsatisfactory in an optical system where absolute signal levels are commonly not known a priori. The conventional solution is ac-coupling between the receiver and the logic quantizer. With this approach, dc logic threshold levels are established by forming a "signal average" of the second data pulse. Signals above the average are considered as logic ONEs, while signals below the average are logic ZEROs. While ac-coupled receivers may work well for encoded continuous data transmission they do not work well for burst mode data transmissions and signals where the time average of the signal may vary.

A well known problem in the art of digital optical communication is the difficulty in using unencoded data, where the data to be transmitted is allowed to have long strings of only ONEs or only ZEROs also referred to as long CIDs (Consecutive Identical Digits) and/or the data is not necessarily DC balanced (i.e. having on average substantially equal amounts of the high logic and low logic values). This is because, for proper operation of an AC coupled receiver, the optimal threshold is usually substantially midway between the logic high and logic low value and should substantially correspond to the average (for brevity "logic high" and "logic low" may be referred to as simply high and low values). Therefore non-transition periods, i.e. a period of long CIDs should be small relative to the time constant determined by the capacitance for coupling between a) a preamplifier of an electrically-converted version of the optical signal and b) a comparator which is used to determine the logic value, i.e. 1 or 0, of the incoming optical signal. In optical links this problem is commonly solved by using encoding of the signal prior to transmission and decoding after reception. The encoding ensures that transition occurs in the optical data signal even if the data is a long string of CIDs. Furthermore, the encoding often ensures that the optical signal is balanced. Disadvantageously, doing so mandates that a decoder be present in the receiving system to remove the formatting and reconstruct the original data. Also, data transmission efficiency is commonly degraded because of the required extra bits for the encoding.

While AC coupling is not always needed in electrical communication systems, it was believed to be required in optical systems, because there is no common electrical connection between the transmitter and the receiver. Nevertheless, eventually some of the above-noted disadvantages were overcome by burst-mode digital optical receivers which use direct current (DC) coupling. Such a DC coupled burst-mode digital optical receiver is disclosed in U.S. Pat. No. 5,025,456 which was intended to adapt to the amplitude of the incoming burst data packet and automatically adjust the logic threshold voltage to the dc center, ideally during the first bit of the input data burst. The inventors later characterized the purpose of this invention as meeting the challenge of having several transmitters on the same optical bus where the power levels may vary dramatically between transmitters, see U.S. Pat. No. 5,430,766. This later patent aimed at solving the problem of having a relatively high amount of constant light from each transmitter combined reaching the receiver. The same inventors also patented a burst mode receiver in U.S. Pat. No. 5,371,763. The above cited patents are incorporated herein by reference.

However, one drawback of these prior arts burst-mode receivers is that they rely on the use of a preamble preceding the payload data in a data burst to set the logic threshold. Such a preamble will often comprise a data sequence aimed at initializing the receiver rather than carry data. Such receivers are therefore often not suitable for receiving unencoded data because correct determination of the first digits after a long CID may not be ensured at least not with good pulse width distortion.

DISCLOSURE OF INVENTION

Today, optical interconnects or optical cables appear to be increasingly important means for transportation of digital information. These links are commonly expected to enable high transfer speed of e.g. 10 Gbit/s or higher. To facilitate simple integration into the system it would often be an advantage to enable the link to robustly carry a data stream which does not require excessive coding which reduces transfer speed. In particular it is desired to enable transmission of a less encoded or even an unencoded data stream; i.e. without requiring the use of preambles and/or encoding to ensure a balanced data stream that would otherwise allow the link to set a suitable threshold before any payload data is received. The link should advantageously be able to tolerate long durations of no data i.e. long series of consecutive identical digits (CIDs) as well as other deviations from a balanced signal. At the same time the receiver should preferably be capable of correctly interpreting the first bit of a data stream received after a period such as even a period of. several days of no data, optionally even without transmission of a preamble. During such a time drifting in the transmitter caused by e.g. temperature and/or aging of the laser may occur or the optical loss from transmitter to receiver may change. Compared to many prior art systems the challenge of providing a suitable logic threshold (here also referred to as just "threshold" for brevity) for the first bit has increased due to the increased transfer speed and hence reduced time allocated to adjust the threshold during this bit. There is therefore a need for an optical receiver which is capable of robustly receiving high speed data which is advantageously substantially unencoded.

In co-pending U.S. application Ser. No. 13/152,053, which is hereby incorporated by reference, this challenge was addressed by realizing that while laser diodes, in particular VCSELs, tend to drift in functionality due to temperature and/or aging it is possible via prior art methods to construct the driver to compensate for this to an extent so that at least most of the time the extinction ratio in a binary signal is substantially constant or only varies slightly such as for example 0.5 dB. In an embodiment of that invention the receiver directly or implicitly uses a previously determined extinction ratio and the peak value that is received as the CID to set the threshold of the receiver. An object of the invention is to provide an alternative method suitably for optical transmission of high speed data and an optical receiver suitable for receiving such data with high accuracy (low loss or distortion of data), even where the data comprises long periods of CID. where the required encoding is very low and advantageously the data is substantially unencoded.

This and other objects have been solved by the invention as defined in the claims and as described herein below.

It has been found that the invention and embodiments thereof have a number of additional advantages which will be clear to the skilled person from the following description.

In an embodiment, the invention in particular provides a novel method of setting the threshold of the invention even when the transmitted data comprises long periods of CID.

In an embodiment the required encoding is very low and advantageously the data is substantially unencoded.

The term "substantially unencoded" is used to include slightly encoded data which according to the invention advantageously could have been transmitted and received without such slightly encoding by the method of the invention. Advantageously the data is fully unencoded.

According to the invention the method has been found to enable high speed optical transmission of data with low loss or distortion of data even when subjected to DC drift. In an embodiment the transmitted data comprises data which is not DC balanced.

In an embodiment the data is not coded to reduce or remove long CIDs during optical transmission.

In an embodiment the present invention relates to a method for optical transmission of data in form of at least one optical signal comprising a binary content, the method comprising
  transmitting the optical signal with the binary content comprising a first logic-high and a first logic-low defining a first modulation amplitude wherein the first modulation amplitude is sub-band modulated with a toggling signal having a first toggling amplitude with a first modulation index relative to the first modulation amplitude,
  receiving the optical signal with an optical receiver circuit and converting the optical signal to an intermediate electrical signal, IES, the IFS having the following parameters:
    i. a second logic-high and a second logic-low defining a second modulation amplitude and
    ii. a second toggling amplitude having a second modulation index relative to the second modulation amplitude,
  providing a decision threshold relative to the IFS as a function of the second modulation amplitude, and
  adjusting the decision threshold by determining (e.g. by measuring) the second toggling amplitude and adjusting the decision threshold relative to the IES based on proportionality between the second toggling amplitude and the second modulation amplitude.

By the method of the invention it has been found that the receiver in a simple way can determine the threshold by determining the proportionality between the second toggling amplitude and the second modulation amplitude. Thereby the need in prior art technology for coding the signal is highly reduced or even avoided.

The term "first" about a parameter is used to indicate that it is a parameter of the signal about to be transmitted, whereas the term "second" about a parameter is used to indicate that it is a parameter of a signal that has been received and optionally converted to an electrical signal e.g. IES.

The term a first logic high means a first logic high signal value of a modulation amplitude and likewise them on a first logic-low means a first logic low signal value of a modulation amplitude.

The first modulation amplitude of the binary signal is the modulation amplitude of the signal to be transmitted and is the difference between the first logic high and the first logic low values. This first modulation amplitude can be selected to have any value within the operation range of the optical transmitter used.

The phrase "an optical signal comprising a binary content" is in the following also referred to as "a binary optical signal".

The phrase "the first modulation amplitude is sub-band modulated with a toggling signal having a first toggling amplitude with a first modulation index relative to the first modulation amplitude" means that at least some of the binary signal is sub-band modulated to obtain the first toggling amplitude, wherein the toggling amplitude is different from the first modulation amplitude.

The term "determine or determining" of a parameter means in an embodiment measuring the parameter e.g. measuring a value and/or an amplitude. In an embodiment the parameter in question is determined using one or more other measured parameters.

The first modulation index is advantageously obtained as the first modulation amplitude divided with the first toggling amplitude e.g. provided in percentage.

The decision threshold is also referred to as the logic threshold or simply the threshold.

Optionally the decision threshold is determined as a function of the second modulation amplitude plus a bias.

In an embodiment the decision threshold is determined as a function of a fraction of the second modulation amplitude plus a bias.

In an embodiment the method comprises at least sometimes adjusting the decision threshold by: measuring the second toggling amplitude and adjusting the decision threshold relative to the IES based on proportionality between the second toggling amplitude and the second modulation amplitude.

In this way the receiver may use the magnitude of the toggling amplitude to predict the modulation amplitude. In the event of a long series of CIDs, i.e. the receiver receives a long series of e.g. logic-low values; the second logic-low and the second toggling ratio provide sufficient information to determine where the logic-high will be when the series of CIDs ends. In an embodiment the receiver is therefore able to set the threshold correctly during such series of CIDs and interpret the first bit correctly after such a period even at high data rate with little or no pulse width distortion. I.e. the receiver recovers the binary signal content and converts the IES in the receiver circuit into a binary electrical signal output downstream of the input via the decision threshold. Hence, the invention will enable optical receivers for substantially or fully unencoded data at high data rates with reduced or no constraints on minimal bandwidth of the signal, i.e. even if the binary content comprises long series of CIDs. In the event of a change in the loss in the transmission from transmitter to receiver, the second modulation index will likely be constant as both modulation and toggling amplitudes are often equally affected.

Advantageous the laser used for transmitting the signal is operating in its linear regime of output. Thereby the first modulation index can be held substantially constant.

As explained above the invention can in an embodiment be used for transmitting and receiving unencoded data. However, the invention can also be applied for transmitting and receiving coded data. Even where the data is coded large advantages can be obtained by the invention because the coded data need not be coded for ensuring low loss or distortion of data, but can for example be coded for any other reasons.

In an embodiment the method of the invention is applied for transmitting coded data, or partly coded data, i.e. where only some parts e.g. a bit length of the data is coded. The coding is for example a scrambling of data or an encryption of data.

In an embodiment a VCSEL (vertical-cavity surface-emitting laser) is used for transmitting the signal and the VCSEL is modulated over a substantially linear regime of output intensity to current so that even if the slope of this curve changes (e.g. due to changes in temperature or aging), the modulation index is constant. Note that in an embodiment a series of CIDs of one logic value does not exclude the presence of a few bits of the other logic value. This is discussed in more detail below.

In an embodiment modulation index is defined as the ratio of the toggling signal relative to an average value of the modulation amplitude over a period of the toggling signal. In an embodiment the toggling amplitude is distinguishable from signal content by having a smaller amplitude, so that the modulation index is less than 50%, but often preferably less than 40%, such as less than 30%, such as less then 20%, such as less than 15%, such as less than 10%, such as less than 7%, such as less than 5%, such as less than 2%, such as less than 1%, such as less than 0.5%. On the other hand the toggling signal should also be distinguishable from the noise floor. This is in an embodiment easier if the toggling signal is substantially binary with a low center frequency so that the same value is maintained for a relatively long time which in turn may allow averaging. On the other hand, it is expected that a minimum value of the modulation index is required such as more than about 0.5%, such as more than about 1%, such as more than about 2%, such as more than about 5%.

Note that in an embodiment the first modulation index, i.e. the ratio of modulation amplitude to toggling amplitude, need not be strictly constant as long as it is predictable for the receiver and/or constant within a tolerable margin.

In an embodiment the present invention find application for links using burst mode transmission where a payload of data is preceded by a preamble. The invention can for example provide the receiver with an improved initial value for the threshold improving an initialization of the receiver based on the preamble.

In an embodiment the invention relates to a receiver circuit arranged to implement the method of the invention. In one such embodiment the invention relates to an optical receiver circuit for receiving a binary optical signal and converting it to an intermediate electrical signal, IES, with a binary content comprising
  a second logic-high and a second logic-low defining a second modulation amplitude, and
  a sub-band modulation of the second modulation amplitude having a toggling amplitude,
  the optical receiver comprising a circuit arranged to measure an toggling amplitude of the second toggling signal, and a circuit arranged to adjust the decision threshold based on the second toggling amplitude.

The invention also relates to corresponding receivers, i.e. receiver circuits according to the invention connected to a photo detector, such as a photo diode.

In an embodiment the invention relates to a transmitter and a driver circuit suitable for driving a light source so that an optical binary signal as described above is obtained.

In an embodiment the optical binary signal is obtained from an electrical binary signal with the first modulating amplitude, which has been subjected to a sub-band modulation with the toggling signal followed by converting the signal to an optical signal.

In an embodiment the optical binary signal is obtained from an electrical binary signal with the first modulating amplitude which is converted to an optical signal while it simultaneously or after the conversion has been subjected to a sub-band modulation with the toggling signal.

In an embodiment the toggling signal has a first toggling amplitude and performs a sub-band modulation of the first modulation amplitude such that the first modulation amplitude alternates between at least 2 values determined by the toggling amplitude. The first modulation index can have any value positive value with the exception of 1.

In an embodiment the invention relates to an optical transmitter comprising a drive circuit comprising an output stage arranged to drive a light source with a waveform based on a binary input signal so that the light source (during use) transmits a binary optical signal having a first modulation amplitude, a first logic-high and a first logic-low, the transmitter further comprising a toggling circuit arranged so that the modulation amplitude is modulated with a toggling signal having a first toggling amplitude preferably having a substantially constant ratio with the first modulation amplitude. In an embodiment such a transmitter is realized by applying a conventional chip for driving a light source, the chip has a programmable modulation and bias current. The toggling signal is then obtained by sequentially programming the modulation current to obtain the toggling signal e.g. using a microcontroller. Depending on the design of the drive chip, programming of a bias current may also be desired to obtain a modulation of both logic-high and logic-low.

In an embodiment of the optical transmitter drive circuit according to the invention, the binary optical signal is obtained by coupling the light source to a Si waveguide and modulating light from the light source by coupling the binary input signal to the waveguide and simultaneously coupling the coupling the toggling circuit to the waveguide, such that the binary input signal and the toggling signal provided by the toggling circuit is driving the light source with a waveform such that the light transmits a binary optical signal having a first modulation amplitude, a first logic-high and a first logic-low, and such that the modulation amplitude is sub-band modulated with the toggling signal to have a first toggling amplitude.

Advantageously the light is separated into at least two branches in the waveguide and the binary input signal as well as the signal from the toggling circuit is coupled to the waveguide in form of modulated voltage to provide a modulated delay of some of the light e.g. one branch of light. The branches of light are thereafter combined to provide the modulated binary optical signal. Due to the delay of the light in one or more branches, the delayed light will be out of phase with light in one or more other branches where the light has not been delayed or where it has bee delayed to a different degree. The delayed light will therefore when merged with light in one or more other branches, therefore more or less extinguish the light, and thereby since the light is delayed in a modulated fashion, the resulting light will in a similar way be modulated with respect to light intensity. To avoid fully light extinguish, the amount of light subjected to the modulated delay may advantageously be less than the amount of light which is not subjected to the modulated delay.

In an embodiment the light is separated into at least two branches in the waveguide and the binary input signal is coupled to the waveguide in form of modulated voltage to provide a modulated delay of some of the light e.g. one branch of light and the signal from the toggling circuit is coupled to the waveguide in form of modulated voltage to provide a modulated delay of some of the light e.g. the other branch of light. The branches of light are thereafter combined to provide the modulated binary optical signal.

In an embodiment the waveguide is a wire waveguide e.g. as described by K. Yamada in "Silicon Photonics. Topics in Applied Physics 119, 1-29, Springer (2011).

In an embodiment the application may provide that series of long CIDs only occur as long series of logic-low or highs, in which case it may be sufficient to only modulate that logic value in the transmitter. In an embodiment the toggling signal is provided by a circuit integrated with the drive circuit.

In an embodiment the modulation of the modulation amplitude is significantly slower than the bit frequency of the signal which may simplify efficient separation of the toggling signal from the signal content. Accordingly, in an embodiment the binary optical signal has a bit frequency and the toggling signal has a center frequency of less than 25% of the bit frequency such as less than 10% of the bit frequency, such as less than 5% of the bit frequency, such as less than 2.5% of the of the bit frequency, such as less than 1% of the bit frequency, such as less than 0.5% of the bit frequency, such as less than 0.1% of the bit frequency, such as less than 0.01% of the bit frequency. However, it is in principle possible to use faster center frequency of the toggling signal.

As noted above, the present invention has shown to provide a significant advantage particularly at high bit rates such that in an embodiment the bit frequency of the optical signal content is larger than 100 Mbit, such as larger than or equal to 1 Gbit, such as larger than or equal to 10 Gbit, such as larger than or equal to 25 Gbit, such as larger than or equal to 50 Gbit, such as larger than or equal to 100 Gbit.

DETAILS OF THE INVENTION

The second toggling amplitude may be applied in a variety of ways to determine a suitable decision threshold. In an embodiment the second modulation index is measured as a part of an initialization and/or during periods where the signal content allows measurement of the second modulation amplitude (MA) and the second toggling amplitude so that the ratio (i.e. the second modulation index) may be determined. After the second index has been determined, the threshold can be adjusted by measuring the toggling ratio which provides information of the second modulation amplitude at least when the second modulation index may be assumed constant. Updating the second modulation index during operation may be advantageous if the second index is expected to change during operation. In an embodiment an activity detector (discussed below) is applied to determine when the binary content of the IES (The IES binary content) is suitable for measuring the second modulation index. In an embodiment the threshold is substantially always updated based on the second toggling amplitude whereas in an embodiment another approach may be applied when allowed by the IES binary content. For example, the IES binary content may in periods be substantially balanced in which case an average may be applied during such periods. In the alternative or in combination with this example, the receiver adjusts the threshold using peak detection in periods when the IES binary content is so that the output from peak detectors may be trusted to reflect the true value sufficiently.

In an embodiment the toggling signal may be used in the receiver. The use of the toggling signal in the receiver comprises advantageously setting the second modulation index as a predetermined value, i.e. assuming a modulation index at the receiver and adjusting the decision threshold based on determining the second toggling amplitude. Such an approach may in an embodiment be preferred where the modulation index of the receiver is known and/or when the accuracy of the threshold is less critical.

In an embodiment the method comprises adjusting a gain in the receiver circuit, e.g. via a feedback loop, so that the second toggling amplitude is substantially constant. This is exemplified in the attached examples.

In an embodiment the method further comprises amplifying the IES thereby adjusting the second modulation amplitude and second toggling amplitude.

In an embodiment setting of the threshold further comprises measuring at least one of the following values
 a. a $P_H$ value related to the second logic-high,
 b. a $P_L$ value related to the second logic-low, and
 c. a MA value related to the second modulation amplitude
and determining the validity of the measured values.

In an embodiment MA is formed by the difference of $P_H$-$P_L$ but alternative ways to measure or determine the modulation amplitude may be applied. In the context of this text the phrase a value "related to" another value or parameter infers a functional relationship between two parameters. In an embodiment "relates to" indicates the possibility of a scaling and/or offset which may be suitable in one implementation of the invention. For example, in an embodiment a value may be determined as a voltage whereas the other is a current or vice versa. For example, the voltage obtained from the current through a resistor, where an offset may be caused by another current flowing through the resistor and/or caused by that the voltage across the resistor refers to a potential other than ground e.g. the positive supply. In one such embodiment the measured values may differ by a proportionality factor. In an embodiment the photo detector is not a linear device and the binary electrical signal is therefore not proportional to the optical signal. In such embodiment $P_H$, $P_L$ and/or MA are compensated for this non-linearity e.g. via a look-up table. In such embodiment the binary electrical signal is understood in the embodiments described herein to be the electrical signal that would have occurred had the photo detector been linear. In an embodiment "a value related to" a second value is taken to mean substantially equal to or in an embodiment equal to.

Depending on the construction of the circuits for measuring at least one of $P_H$, $P_L$ and MA these measurements may deviate from the actual value. In an embodiment the measured values are pattern dependent, i.e. depend on the signal content (see e.g. discussion of peak detectors below). Depending on the signal content and the design of the circuits some signal content may therefore render the output from one or more of $P_H$, $P_L$ and MA invalid. For example a long series of CIDs of logic-high may render measurement of $P_L$ and MA invalid in which case embodiments of the present invention will instead depend on the valid parameters (in this example $P_H$) and the toggling amplitude applied to the logic high value. Different examples where measured values are invalid and how to detect this are discussed further below.

The decision threshold (or simply the threshold) is a threshold for deciding if a signal value is a logic-low (0) or a logic-high (1). Where a signal value is above the decision threshold is determined to be logic-high (1) and where a signal value is below the decision threshold is determined to be a logic-low (0).

Advantageously the decision threshold is provided as a function of the second toggling amplitude below the second logic high and above the second logic low. This function can e.g. be a multiple of below 1, advantageously between 0.3 and 0.7 of the second toggling amplitude.

In an embodiment the decision threshold is set or adjusted based on the measured values when the measured values are determined to be valid. In an embodiment the threshold is set as a function of a fraction of the second modulation amplitude optionally shifted by a bias, i.e. a constant value. In one such embodiment the threshold is set to a value based in the present $P_H$ and present $P_L$ when both present $P_H$ and present $P_L$ are deemed valid. In an embodiment the threshold is set as a value related to the center value between $P_H$ and $P_L$. In an embodiment the transmitter may (as an example) exhibit nonlinearity so that a DC balanced signal content does not produce a DC balanced optical signal. In one such embodiment or other embodiments it may be preferable to set the threshold to a value related to $(P_H+P_L)/x$ where x may take values different from 2. It is also possible to set the threshold based on MA. For example, the threshold is in an embodiment set to a fraction of MA optionally plus a bias, e.g. as MA/y plus $P_L$ when at least $P_L$ is valid and as $P_H-(1-1/y) \cdot MA$ when only $P_H$ is valid. In one such embodiment y is arranged so that the threshold, $TH_P$, is $<TH_P<P_H$. As noted above, MA may be found based on the proportionality with the second toggling amplitude i.e. as function of the second modulation index divided by the second toggling amplitude.

Whether to use $P_L+MA/y$, $P_H-(1-1/y) \cdot MA$ or $(P_H+P_L)/x$ when both $P_L$ and $P_H$ are valid is in an embodiment equivalent. Accordingly, the phrase "setting the threshold to a fraction of MA optionally plus a bias" encompasses setting the threshold according to $(P_H+P_L)/x$. In an embodiment x is arranged so that $P_L<(P_H+P_L)/x<P_H$. In an embodiment x and/or y is determined so that the threshold is equal to the average obtained from a DC balanced signal content. In an embodiment the method comprises setting the threshold determined in the manner of the prior art receivers such as those cited above. In an embodiment setting phrase "setting the threshold to a fraction of MA optionally plus a bias" encompasses setting the threshold based on an average (AVG) of the electrical signal. In one such embodiment the binary content of the binary optical signal is encoded to ensure DC balance except for long series of CIDs. Accordingly, the average of the signal may provide a suitable threshold.

In an embodiment at least one of the values $P_L$ and $P_H$ is obtained via at least one peak detector. In an embodiment the receiver circuit off-sets the electrical signal for example by a threshold value which seeks to be centered between the values $P_L$ and $P_H$. In an embodiment this off-set also off-sets the value detected by the peak detector and which therefore measures an off-set version of the high or low value of the optical signal. One example of such an implementation of peak detectors may be found in FIG. 6 of U.S. Pat. No. 5,371,763. In an embodiment the off-set value is a previous determined value, such as the previously set threshold. In an embodiment the present values $P_L$ and $P_H$ are therefore obtained relative to a previous determined threshold value. In one such example the receiver circuit shunts a variable current from the photocurrent from the photo detector as a way to set the threshold. Accordingly, $P_L$ and $P_H$ may depend on the current setting of the threshold for example when measured as the peak values from a voltage across a load resistors through which the remaining photocurrent runs. In another embodiment the peak detectors are arranged to process a signal which is substantially proportional to light impinging on the photo detector and therefore the values $P_L$ and $P_H$ are determined as values proportional to a current from the photo detector in response to the optical signal.

As will be well known to the skilled person, peak detectors may be constructed in several ways. In an embodiment the peak detector will have a limited bandwidth $BW_P$ and/or the peak detector will be preceded by a low pass filter resulting in an effective bandwidth $BW_P$ for the peak detector including the filter. In an embodiment this allows the peak detector to ignore undesirable variations of the signal such as noise components and/or peaks caused by imperfections in the transmitter such as overshoot or undershoot. In an embodiment the peak detector comprises an amplifier, such as a difference amplifier, with a bandwidth $BW_P$. In an embodiment there is a trade-off between power consumption of such an amplifier and extent of its bandwidth to high frequencies. It may therefore be beneficial to design the peak detector with a lower bandwidth. The same may be true for a transmitter where a light source is driven to provide the specified bandwidth. If the transmitter is bandwidth limited, the rectangular shape of single 1 bit may be reduced to a soft peak which only achieves the peak value for a small duration of the bit period. In the event of consecutive transmission of the same value even a bandwidth limited transmitter will, in an embodiment, transmit the peak value for a substantial part of the time. In an embodiment where the receiver is paired with such an embodiment of a transmitter, it may be advantageous to allow the peak detector to have a bandwidth with a cut off frequency below the required frequency for detecting the peak value of a single bit.

In an embodiment the peak detector has an effective bandwidth, the peak detector comprises a difference amplifier with a bandwidth $BW_P$ with an upper cut off frequency corresponding to the time period of one half bit or more, such as 1 bit or more, such as 2 bits or more, such as equal to 3 bits or more, such as equal to 4 bits or more, such as equal to 5 bits or more, such as equal to 10 bits or more, such as equal to 20 bits or more. In an embodiment the peak detector comprises a hold and/or reset function. In an embodiment the peak detector requires a number of consecutively identical bits to validly detect a peak value. In one such embodiment the peak detector holds this detected value until a new string of consecutively identical bits is received. In an embodiment the determination of 'when to hold and/or reset' is incorporated into the peak detector. In an embodiment this determination is incorporated into the TAC discussed below. In an embodiment holding the value of the peak detector occurs within the TAC. TAC (threshold adjustment circuit) is a circuit or combination of circuits that provides automatic or semi-automatic adjustment of the threshold during operation such as feedback loops and controllers.

In an embodiment the peak detector incorporates a capacitor or an equivalent element which is charged to the measured peak value. In an embodiment the peak detector therefore has a characteristic discharge time after which the output value changes significantly in the event of lack of input, in an embodiment this corresponds to the time span of 1 bit or more, such as 2 bits or more, such as equal to 3 bits or more, such as equal to 4 bits or more, such as equal to 5 bits or more, such as equal to 10 bits or more, such as equal to 20 bits or more, such as equal to 30 bits or more, such as equal to 40 bits or more, such as equal to 50 bits or more, such as equal to 100 bits or more, such as equal to $10^3$ bits or more, such as equal to $10^4$ bits or more. In an embodiment the time span is equal to $10^4$ bits or shorter, such as equal to $10^3$ bits or shorter, such as equal to $10^2$ bits or shorter, such as equal to 10 bits or shorter, such as equal to 5 bits or shorter, such as equal to 4 bits or shorter, such as equal to 3 bits or shorter, such as equal to 2 bits or shorter, such as equal to 1 bit or shorter.

The criterion for validity $P_H$, $P_L$ and/or MA may depend on the design of the receiver and/or the use of $P_H$, $P_L$ and/or MA. For example, a receiver where the threshold is determined by $(P_H-P_L)/x$ validity of $P_H$ and $P_L$ values often requires that the measured value substantially reflect the true value. Therefore in an embodiment validity $P_H$, $P_L$ and/or MA require that the value reflects the true value within a certain accuracy, such as e.g. within 30%, such as e.g. within 20%, such as e.g. within 15%, such as e.g. within 10%, such as e.g. within 5%, such as e.g. within 1%, such as e.g. within 0.5%.

In co-pending U.S. patent application 61/506,842 (which is hereby incorporated in its entirety) embodiments are provided where peak detection of the electrical signal is referenced against peak detection of the signal of a reference stage. This method cancels out pattern dependence in the peak detectors at least in so far that the peak detectors have substantially the same pattern dependence for example by being substantially identical. An example of this method is provided in the examples of the present text where a limiting amplifier corresponds to the reference stage. While this method allows for a greater variability in the binary content compared to most prior arts systems which require a substantially balanced content, this method may not be effective for all signal content. Accordingly, the requirement on the binary content so that $P_H$, $P_L$ and/or MA are valid may in an embodiment be relaxed. Examples of binary content where $P_H$, $P_L$ and/or MA are invalid may include a long series of CIDs in which case the peak detector arranged to measure the other logic value to drift so e.g. $P_H$ and $P_L$ outputs the same or indistinguishing value which in turn may make it impossible to set a suitable threshold based on this method alone. For embodiments which rely on such embodiments of U.S. patent application 61/506,842, invalidity of $P_H$, $P_L$ and/or MA may be taken to mean that the value(s) is not reliable even though pattern dependency at least to some extent cancels out. Depending on the design of the peak detector a single or few bits of one logic value during a long series of another value may be insufficient to provide a reliable detection of the one logic value. Accordingly, in an embodiment the length of a series of CIDs of logic-high or logic-low is determined disregarding series of CIDs of the other logic value shorter than a minimum length, such as shorter than or equal to 10 bits, such as shorter than or equal to 5 bits, such as shorter than or equal to 3 bits, such as shorter than or equal to 2 bits, such as shorter than or equal to 1 bit.

In an embodiment the method comprises initializing the receiver for example to establish a modulation index of the transmitter with the receiver. In an embodiment the initialization is performed during reception of a known signal. In an embodiment, the optical receiver forms part of a two-way link having a far end receiver, a near end receiver, a far end transmitter and a near end transmitter. In an embodiment the near end receiver and transmitter cooperate to determining whether an optical connection (typically via a fiber or air) is established to a far end. In an embodiment the transmitter transmits test pulses at regular intervals. These pulses are in an embodiment kept at a relatively high power level to ensure reception at the far end even if the link is poor. On the other hand, the pulses are in an embodiment kept short to ensure eye safety. At the same time the receiver is arranged to detect test pulses from the far end. In an embodiment the receiver circuit is arranged to have a specific mode of operation only suitable for detection of an incoming pulse. In this way the receiver circuit may reduce power consumption during time where no connection is established. In the event that a test pulse is received, the near end transmitter may begin to transmit one or more preset data series allowing the far end receiver to initialize. Similarly, the far end transmitter may begin to transmit one or more preset data series allowing the near end receiver to initialize. In an embodiment, this initialization process further comprises transmitting data quality parameters between the near end and far end, e.g. to optimize the transmitters. In an embodiment it is advantageous that the transmitter transmits with minimal power consumption while at the same time providing robust reception of the signal at the other end. The above consideration regarding initialization and self-configuration of an optical link is the focus of co-pending U.S. Provisional Application for a Patent 61/228, 848.

In an embodiment the method further comprises determining an average (AVG) of the electrical signal, IES. In an embodiment the circuit comprises an averaging circuit (such as a suitable low pass filter) whereas in an embodiment AVG is determined as part of the TAC. The value of AVG may be applied to determine the DC balance of the signal i.e. the ratio of ZEROs and ONEs. As will be discussed further below in regard to validation of the $P_L$, $P_H$ and MA values, an average substantially offset from the threshold may in an embodiment indicate that the high or low values are rarely experienced so this peak value may not be accurately determined (i.e. valid).

In an embodiment the AVG is calculated from a time period, such as equal to or longer than $10^{-9}$ seconds, such as equal to or longer than $10^{-8}$ seconds, such as equal to or longer than $10^{-7}$ seconds, such as equal to or longer than $10^{-8}$ seconds, such as equal to or longer than $10^{-5}$ seconds, such as equal to or longer than $10^{-4}$ seconds, such as equal to or longer than $10^{-3}$ seconds, such as equal to or longer than $10^{-2}$ seconds, such as equal to or longer than $10^{-1}$ seconds, such as equal to or longer than 1 second. In an embodiment the average AVG is taken over a time period, such as equal to or shorter than 1 second, such as equal to or shorter than $10^{-1}$ seconds, such as equal to or shorter than $10^{-2}$ seconds, such as equal to or shorter than $10^{-3}$ seconds, such as equal to or shorter than $10^{-4}$ seconds, such as equal to or shorter than $10^{-5}$ seconds, such as equal to or shorter than $10^{-8}$ seconds, such as equal to or shorter than $10^{-7}$ seconds, such as equal to or shorter than $10^{-8}$ seconds, such as equal to or shorter than $10^{-9}$ seconds. In an embodiment the average is over a period substantially equal to 1 bit or more, such as equal to 2 bits or more, such as equal to 3 bits or more, such as equal to 4 bits or more, such as equal to 5 bits or more, such as equal to 10 bits or more, such as equal to 20 bits or more, such as equal to 30 bits or more, such as equal to 40 bits or more, such as equal to 50 bits or more, such as equal to 100 bits or more, such as equal to $10^3$ bits or more, such as equal to $10^4$ bits or more, where the duration of 1 bit may be determined from the bit rate BR. In an embodiment the time period is substantially equal to $10^4$ bit or less, such as equal to $10^3$ bits or less, such as equal to 100 bits or less, such as equal to 50 bits or less, such as equal to 40 bits or less, such as equal to 20 bits or less, such as equal to 10 bits or less, such as equal to 5 bits or less, such as equal to 3 bits or less, such as equal to 2 bits or less, such as equal to 1 bit or less.

In an embodiment the AVG is obtained from a period related to the discharge time of the peak detectors discussed above. In an embodiment AVG is calculated from a time period corresponding to 10% or more of the discharge time, such as 20% or more of the discharge time, such as 30% or more of the discharge time, such as 40% or more of the discharge time, such as 50% or more of the discharge time, such as 60% or more of the discharge time, such as 70% or more of the discharge time, such as 80% or more of the discharge time, such as 90% or more of the discharge time, such as 100% or more of the discharge time, such as 110% or more of the discharge time.

In an embodiment the method further comprises applying an activity detector (i.e. a circuit with a function) to indicate the activity in the electrical signal. As will be explained below, an activity detector may in an embodiment provide the TAC with an indicator of the properties of the signal second. Depending on the construction of the peak detector the value determined by the peak detector may depend on the peak (i.e.

the size and shape of the signal corresponding to a bit) and the bit pattern i.e. the ratio of ZEROs to ONEs and/or how often CIDs are received consecutively e.g. for two, three, four, five or ten bits in a row. To determining the validity of the output from a peak detector it may therefore be useful to apply an activity detector. In an embodiment the activity detector is a circuit that either provides an indicator value or allows the TAC or other circuitry to calculate an indicator value for one or more of:

1. Number of transitions between (logic) high and (logic) low within a predetermined time period.
2. Number incidences of high and/or low values longer than a predetermined length over a predetermined time period, in other words the number of CIDs of logic high and/or low values longer than a predetermined length (e.g. 3) over a predetermined time period.

In an embodiment the predetermined time period may be any of the values cited in relation to the determination of the average above and/or in regard to present and previous above. In an embodiment the predetermined time period is not specifically determined but rather a time within a suitable range is used. In an embodiment the indicator value is a voltage or current proportional to the number. In an embodiment the indicator is a digital value proportional to the number. In an embodiment the indicator is a binary value which indicates whether the number exceeds a specified threshold, such as 1 or more, such as 2 or more, such as 10 or more, such as 100 or more. In an embodiment the indicator values are updated similarly as a rolling average i.e. substantially continuously whereas in an embodiment the activity detector provides indicator(s) for non-overlapping time segments. The latter may in an embodiment be implemented via a counter counting, the number of relevant events and the counter having a hold register for holding a value and a reset function. Storing of the value in the hold register and resetting the counter may then, for example, be controlled by a digital oscillator with a set frequency. In this way the indicator value may for example be updated e.g. each time the predetermined time interval expires.

In an embodiment two or more peak detectors are applied to detect the high value or equivalently different functionality may be applied by the same peak detector. Each of the two or more peak detectors has a bandwidth and discharge time so that it is suited to detect the peak value for a specific activity level. In an embodiment one peak detector is designed to obtain the peak value for a very long constant signal, whereas a second peak detector is suitable for detecting a peak value for a medium amount of signal activity. In an embodiment an indicator from the activity detector allows the TAC to determine which peak value to apply. In an embodiment applying separate peak detectors and/or applying different functionality in one peak detector depending on signal activity may provide better noise resistance as the same noise will influence determination of the peak differently depending on whether the signal changes frequently (i.e. have many transitions) or is substantially constant. In an embodiment the bandwidth for the two or more peak detectors is different where the upper bandwidth is lower for the peak detector arranged to detect the peak value of a substantially constant signal.

A threshold adjustment circuit (TAC) may in an embodiment be implemented in digital circuitry, analog circuitry or a combination thereof. It may in an embodiment be a separate circuit, either integrated along with the remaining receiver circuit or alone. In an embodiment the TAC in whole or in part is considered as an integrated controller which may be programmable. In an embodiment a part of the TAC belongs to an external circuit such as in an external controller. For example the determination of validity of the peak values as well as the determination of threshold may reside with an external controller not integrated with the electrical high speed data path of the receiver, e.g. transimpedance amplifier and a decision circuit, whereas circuitry for adjusting the threshold and/or circuitry assisting in applying the peak values (e.g. the circuit of FIG. 4 below) could be internal circuits while still part of the TAC. The term 'decision circuit' refers to a circuit arranged to provide an essentially binary data stream from an analog input signal. Other terms used in the art are comparator and digital quantizer. Commonly a limiting amplifier is applied as the decision circuit.

In an embodiment one or more functions belonging to the TAC are integrated into one or more functions of the receiver circuit. One example could be integrating one or more functions of the TAC into one or more peak detectors so that each peak detector may determine whether the apparent value detected from the signal should be deemed valid. In the present text it is assumed that the validation of the values $P_H$, $P_L$ and/or MA resides in a distinct TAC circuit but it should be kept in mind that the invention is not limited to such implementation.

Setting of the threshold may be confined to a separate circuit or distributed in the receiver circuit such as into the peak detectors. The threshold may be set in one or more of several parts of the receiver circuit depending on the design of the circuit. In an embodiment the threshold is set by a shunt current source suitable for shunting part of the current from the photo detector so as to adjust signal input to a decision circuit relative to a reference value for the decision circuit effectively adjusting the threshold for the binary electrical signal. In an embodiment the threshold is set by an offset for an amplifier, such as an amplifier converting a current from the photo detector to a voltage. Such an amplifier could for example be a transimpedance amplifier or an equivalent. In an embodiment the threshold is set as a threshold for a decision circuit, such as a differential amplifier having the threshold as one input and an electrical signal as the other. This amplifier may in an embodiment be wholly or partly limiting.

In an embodiment characteristics of IES are measured at different nodes in the circuit e.g. for threshold, average and peak detection. For simplicity the present text considers the corresponding value of IES at the same node, see for example FIG. 1 before and after the differential amplifier 103.

As discussed above, the determination of the validity of either $P_H$ or $P_L$ resides with the TAC either as a separate circuit or integrated into one or more functions of the remaining receiver circuit. In an embodiment the present $P_H$ value and/or MA is deemed invalid in the event that the current signal over an extensive time period adjacent to determining the present $P_H$ value has been dominated by low values, i.e. no or few high values have been received for an extensive time period. Similarly, the present $P_L$ value and/or MA is invalid in the event that the current signal over an extensive time period adjacent to determining the present $P_L$ value has been dominated by high values. In an embodiment "dominated" is more than 50% of the time, such as more than 60%, such as more than 70%, such as more than 80%, such as more than 90%, such as more than 95%, such as 100%.

In an embodiment dominated by for example logic-high values refers to no or few occurrences of 2 or more identical low value bits consecutively in a period of time, such as 3 or more bits, such as 4 or more bits, such as 5 or more bits, such as 6 or more bits, such as 10 or more bits and vice versa. In other words, this means that the optical signal may be dominated by high values when a specified length of CIDs of low values occurs rarely or not at all. In an embodiment, the term rarely relates to the properties of the respective peak detector. The peak detector may require a number of occurrences of CIDs of specified length to obtain an accurate measurement. Rarely refers here to a number below this value. In an embodiment rarely refers to less than 1000, such as less than 100, such as less than 50, such as less than 10, such as less than 5, such as less than 2 within the time period.

In an embodiment the extensive time period takes one of the possible values specified in relation to the determination of AVG, including the discharge time of the peak detectors or a period specified in relation to the span between previous and present values.

In an embodiment the threshold ($TH_P$) is compared to the average AVG of the electrical signal to determine the validity of $P_L$, $P_H$ and/or MA. In an embodiment a threshold $TH_P$ determined using either the $P_L$ or $P_H$ as bias and a fraction of MA is compared to AVG to determine the validity of $P_L$, $P_H$ and/or MA. For a DC balanced signal AVG and $TH_P$ should preferably be substantially equal. In an embodiment $TH_P$ and AVG are obtained at different times. For example; in an embodiment $TH_P$ is a previous $TH_P$ whereas AVG is the present AVG. One such previous value could in an embodiment be the latest value of $TH_P$ and this threshold is assumed substantially constant when the DC balance of the signal is evaluated. In an embodiment the time span between obtaining $TH_P$ and AVG is substantially less than the time period within which the transmitter may be expected to drift or optical loss change, i.e. the previous threshold $TH_P$ should still be a valid threshold at the time of comparison. In an embodiment this time span may be any of the times or in relation to the previous and present values or AVG.

In an embodiment a substantial deviation between AVG and $TH_P$ indicates that either present $P_L$ or $P_H$ is invalid, so that a. when AVG>$TH_P$ then $P_L$ is deemed invalid and
b. when AVG<$TH_P$ then $P_H$ is deemed invalid.

In an embodiment the deviation is calculated as $$100\% \cdot \left| 2 \frac{AVG - TH_P}{P_H - P_L} \right|,$$

so that an AVG equal to either the previous $P_L$ or $P_H$ is a 100% deviation. In an embodiment a substantial deviation is larger than or equal to 5%, such as larger than or equal to 10%, such as larger than or equal to 20%, such as larger than or equal to 30%, such as larger than or equal to 40%, such as larger than or equal to 50%, such as larger than or equal to 60%, such as larger than or equal to 70%, such as larger than or equal to 80%, such as larger than or equal to 90%, such as larger than or equal to 95%.

As previously mentioned the peak detectors commonly have a discharge rate. Therefore, the decrease of the output of a peak detector with a similar rate may be an indicator that respective signal value is not present and the measurement may therefore be invalid. Therefore in an embodiment a rate of change in $P_L$ or $P_H$ indicates that the $P_L$ or $P_H$ is invalid. In an embodiment the rate of change, of e.g. AVG, in the event of a long set of CIDs may be different from the discharge rate of the peak detector. Therefore, their relative change may be an indicator of the signal comprising e.g. a long set of CIDs. Furthermore, in this event the other peak detector will likely exhibit little change which may be a further indicator of a long set of CIDs. Accordingly, in an embodiment a change in $P_L$ or $P_H$, optionally adjusted for an offset relative to the binary electrical signal, relative to the other value and/or an average value related to the electrical binary signal indicates that the changing $P_L$ or $P_H$ is invalid.

In an embodiment one or more of the above indicators may be combined to determine the validity of the measurement of $P_L$ and/or $P_H$. For example the activity detector may be applied in combination with deviation of AVG and $TH_P$ to determine validity. This is further discussed in relation to the activity states below.

In an embodiment one or more of the indicators and values available to the TAC such as indicators from the activity detector optionally in combination with the AVG, a previous threshold, a present threshold, a previous $P_L$ and/or $P_H$ and/or present $P_L$ or $P_H$, a rate of chance in the $P_L$ or $P_H$, a relative change in the $P_L$ and/or $P_H$, a deviation between AVG and a threshold, one or more indicator values obtained via the activity detector, and the domination of the other value in determining $P_L$ or $P_H$, allow the TAC to determine a state of the signal. In an embodiment the state of the signal is taken to mean that the TAC considers the factors for setting the state when determining the validity of the peak measurement. In an embodiment the TAC applies an indicator to indicate the state but this may not be necessary. Therefore, in an embodiment the present $P_L$ or $P_H$ value is determined by a TAC from two or more of the parameters mentioned above.

In an embodiment the states comprise two or more of the following possibilities:
High activity
Medium activity
Low activity In an embodiment "high activity" is taken to mean that the signal comprises many transitions, such as substantially like a dotting sequence. As discussed above, a peak detector may in an embodiment not have sufficient bandwidth to determine $P_L$ or $P_H$ from a series of CIDs shorter than e.g. 3 bits. In an embodiment 'high activity' is defined as sufficiently high activity so that substantially accurate detection of either $P_L$ or $P_H$ is unlikely. In an embodiment "unlikely" is less than 99%, such as less than 95%, such as less than 90%, such as less than 75%, such as less than 50%. In an embodiment "substantially accurate" is taken to mean within 50%, such as within 30%, such as within 15%, such as within 10%, such as within 5%, such as within 1%. In an embodiment the limited bandwidth in the determination of $P_L$ or $P_H$ will cause these values to be underestimated. In an embodiment this error may be estimated from the activity and/or the DC balance of the signal and therefore a compensation for this error may be possible. Therefore, in an embodiment the method comprises estimating the error and compensating the peak values accordingly before updating the threshold.

As discussed above, in an embodiment the receiver references the peak detection of the electrical signal (i.e. $P_L$ and $P_H$) against peak detection of the signal from a reference stage to cancel the pattern dependency of the peak detectors. In an embodiment, this method allows setting of a suitable threshold even for binary content exhibiting high activity.

In an embodiment the AVG value may be applied in determining whether the activity is high in the sense that accurate detection is unlikely. In the event that AVG deviates substantially from the threshold it may be likely that a substantial amount of consecutively high or low values are found in the signal pattern and therefore the corresponding peak value may still be detected. In an embodiment such a situation will cause the TAC to determine that the state of the signal is "medium activity" instead of "high activity" even though a high number of transitions may occur. In an embodiment the activity detector provides an indicator relating to the number of consecutively identical bits. In one such embodiment the comparison of AVG with the threshold may be less relevant in order to determine whether $P_L$ or $P_H$ may be determined robustly. Instead the TAC may in an embodiment deem that the signal comprises "high activity" only when this is not the case.

One or more actions may be taken by the TAC when a high activity state is determined. In an embodiment a state of high activity causes the receiver to perform at least one of the following:

Setting the threshold based on AVG of the signal.
Setting the threshold based on $P_L$ and $P_H$ values relative to corresponding $P_L$ and $P_H$ values measured from the output of a reference stage, such as a limiting amplifier.
Determining the DC balance of the signal by determining a deviation between AVG and $TH_P$, and adding suitable offset values to $P_L$ and/or $P_H$ optionally depending on the deviation.
Maintaining a constant threshold.

In an embodiment a setting of "Medium activity" corresponds to the occurrence of sufficient activity of transitions so that both $P_L$ and $P_H$ are likely attainable while at the same time sufficiently long strings of consecutively identical values occur relative to the characteristic times of the peak detectors, so that both $P_L$ and $P_H$ are likely attainable with sufficient accuracy. In an embodiment a setting of medium activity indicates that $P_L$ and $P_H$ are valid.

In an embodiment low activity indicates that few transitions occurs within a time frame where the transmitter is likely to drift or optical loss change or a time frame corresponding to the discharge time of the peak detectors so that their output is not reliable. In an embodiment low activity corresponds to long series of CIDs mentioned above. In this setting the receiver may in an embodiment utilize a specialized peak detector with a long discharge time or a reset and hold as mentioned previously. However, in an embodiment low activity corresponds to $P_L$ or $P_H$ deemed invalid and the threshold is set accordingly based on the toggling amplitude.

In an embodiment the threshold is updated at certain intervals which are preferably shorter than the time span in which the transmitter is expected to drift or changes in insertion loss are likely to occur. There may therefore be a significant difference for links applied in e.g. a computer server which is rarely physically moved and a link applied to connect two consumer products where an optical fiber may be exposed to bending. The time frame may therefore in an embodiment be any of times cited in relation to the span between previous and present values. Drift in the transmitter may for example be caused by temperature which, in an embodiment, is compensated to some degree by the driver of the light source. Accordingly, large drift may in an embodiment be expected only for large temperature changes. Another contribution to drift may be aging depending on age, time in operation and/or amount of optical energy generated by the light source. Depending on the light source such aging may cause more or less abrupt changes. A skilled person may therefore, in an embodiment, take these times into account so that the threshold is updated sufficiently often to accommodate changes while not so often that an intolerable increase in power consumption occurs in the receiver.

As should now be clear to the skilled person, the design of the peak detectors (or any other circuit for determining the logic-high and/low value of the signal), the design of the receiver (e.g. whether a reference stage is applied to cancel pattern dependence) and the expected binary signal content must in an embodiment be balanced to ensure correct setting of the threshold in the receiver. In embodiments where it is needed the designer must device suitable tests for detecting when a peak value may not be valid. The previous text has provided several examples of such tests but other indicators may be devised without parting from the scope of the invention. It may in an embodiment be necessary for the designer of the receiver to balance the complexity of the indicators with the robustness of the system. Often more complex tests will lead to a more complex circuit which potentially has high power consumption and/or chip area consumption. A designer could, for example, apply a simulation tool to determine whether a specified design of peak detectors (or another method of determining the high and/low value) and the designed indicators and TAC are sufficiently robust.

If there are any inconsistencies between text incorporated by reference and the text explicit provided herein, the text explicit provided herein shall prevail.

DESCRIPTION OF DRAWINGS AND EXAMPLES

The invention will be explained more fully below in connection with a preferred embodiment and with reference to the drawings in which.

The figures are schematic and may be simplified for clarity. Throughout, the same reference numerals are used for identical or corresponding parts.

Figure 1:
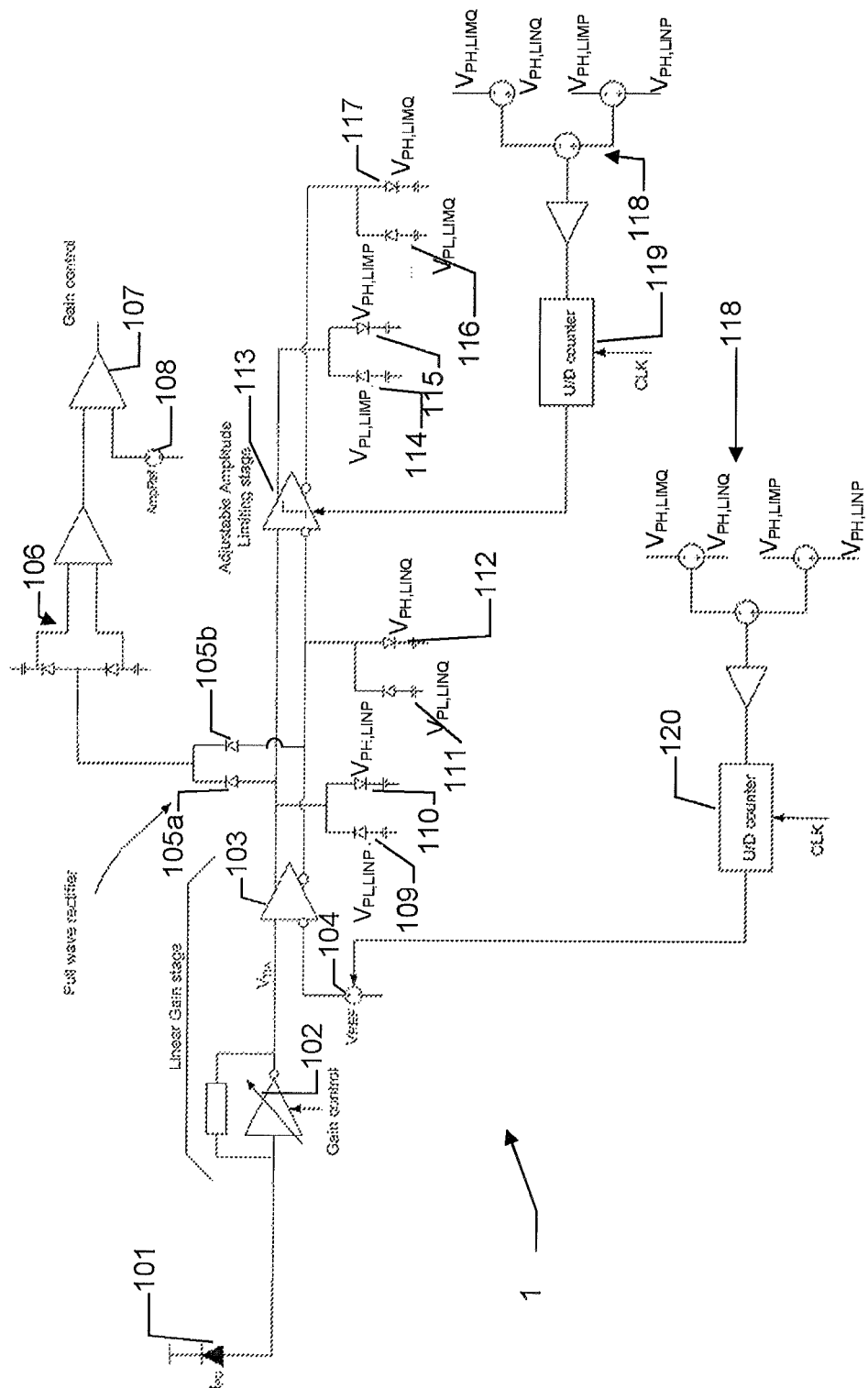
FIG. 1 is a schematic illustration of a receiver according to the invention in a mode where the binary content of the signal is not a long series of CIDs.
Figure 2:
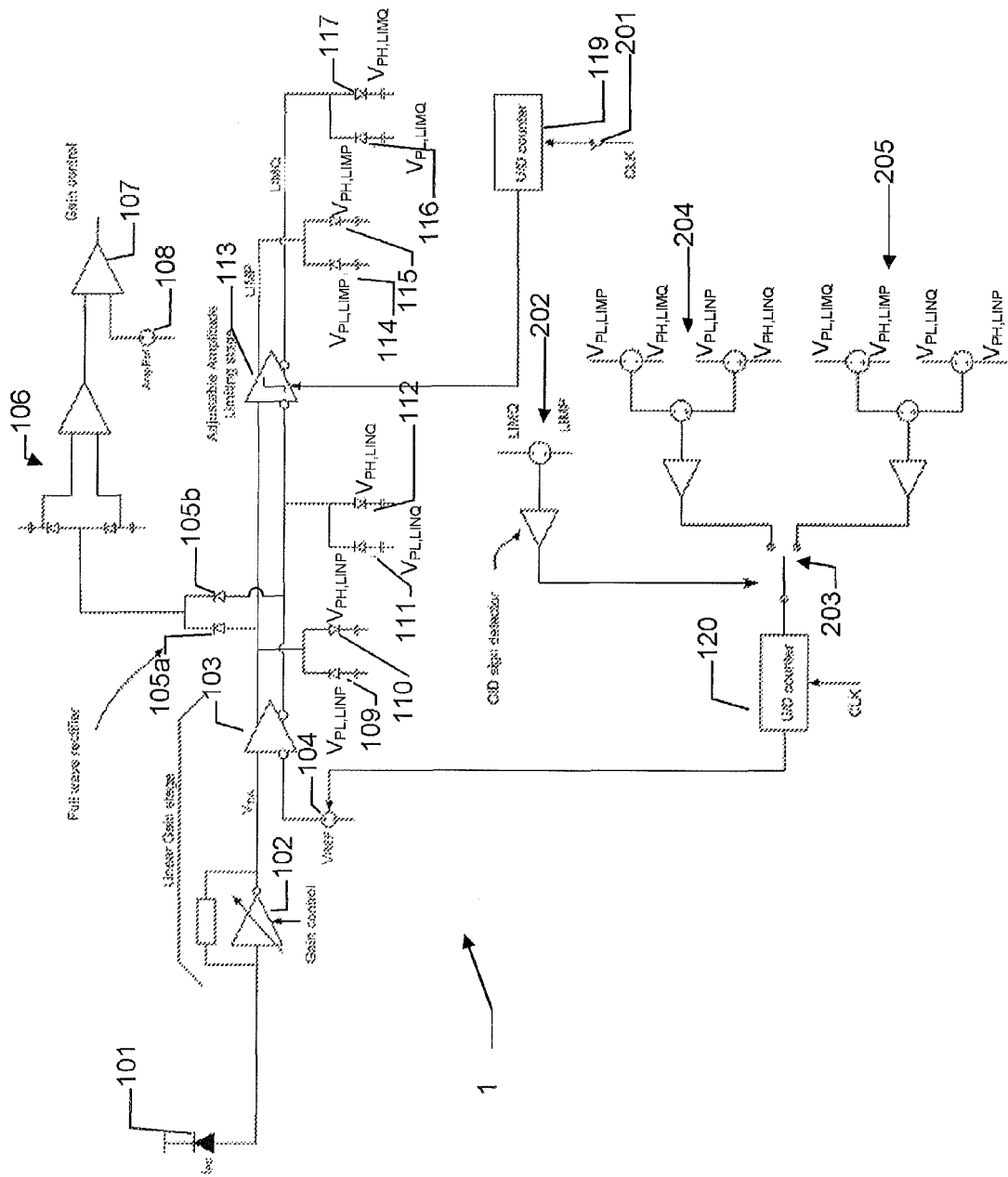
FIG. 2 shows the receiver according to FIG. 1 in a mode suitable for a long series of CIDs.

FIG. 1 shows a receiver circuit of the invention in a mode where the binary content of the signal is sufficiently active that the peak detectors 109-112, 114-117 provide sufficient information of the logic-levels to reliably set a decision threshold. FIG. 2 shows the same receiver in a mode where the binary content comprises a long series of CIDs. As discussed an activity detector, optionally in combination with the TAC, may be used to determine when the receiver optimally operates in the mode of FIG. 1 or of FIG. 2. The activity detector is not shown and the TAC is partially shown as 118, 119, 202-204, but circuitry controlling the mode of the receiver is not shown. This could be performed by an internal or external digital controller or constructed using analog circuitry. The receiver circuit 1 is connected to a photo diode 101 for receiving the binary optical signal and converting it into a current which is converted to voltage $V_{TIA}$ via the transimpedance amplifier 102. Here $V_{TIA}$ may be seen as the intermediate electrical signal (IES) discussed above, which in this embodiment is input to the differential amplifier 103 and the decision threshold $V_{REF}$ is the other input. In this embodiment the differential amplifier 103 is a linear amplifier (i.e. non-limiting) so the toggling signal is detectable in the output, $IES_{DIFF}$, of the amplifier 103. The gains of 103 are in this description considered to be 1 for simplicity but may take any suitable value. The outputs of the linear differential amplifier 103 are connected to diodes 105a and 105b connected to the inverted and non-inverted output, respectively. Their collective output provides the maximum value from the inverted and non-inverted output which is logic-high from the non-inverted output and logic-low from the inverted output. For a threshold value, $V_{REF}$, where the output of the amplifier is symmetric about $V_{REF}$, the collective output of the diodes 105 will in an embodiment provide a substantially constant output related to $V_{REF}$ plus half the modulation amplitude. This output will exhibit the toggling signal with about half the toggling amplitude. The diodes 105 may be said to form a so-called full wave rectifier circuit which may include the differential amplifier 103 depending on definition.

The toggling amplitude is measured by the toggling amplitude detector circuit 106 where two peak detectors linked to the output of the diodes 105 provide input to a differential amplifier. The measured toggling amplitude is compared to the reference (AmpRef) 108 by the amplifier 107 which is linked to a gain control of the transimpedance amplifier 102. In this way a feedback loop is formed arranged to maintain constant toggling amplitude. For example, in the event of increased loss between transmitter and receiver due to bending of a fiber, the gain of the transimpedance amplifier 102 will be increased to achieve constant toggling amplitude. If the modulation index from the receiver is constant the modulation amplitude of the IES will hence also be maintained substantial constant.

The non-inverted output of the amplifier 103 is further connected to peak detectors 109 and 110 arranged to measure values related to the logic-high ($V_{PH,LINP}$) and logic-low ($V_{PL,LINP}$) values, respectively. Similarly the inverted output is connected to peak detectors 111,112 arranged to measure values related to the logic-high ($V_{PH,LINQ}$) and logic-low ($V_{PL,LINQ}$) values of the inverted signal, respectively. The peak detectors 109-112,114-117 and of those 106 are shown here in schematic form as a diode connected to a capacitor but may in principle have any suitable design for suitable peak detection. The output of the amplifier 103 is further connected to limiting amplifier 113 which serves the function of reference stage in the terminology of the methods disclosed in co-pending U.S. provisional application 61/506,842. The output swing of amplifier 113 is adjustable corresponding to adjusting the modulation current of a reference stage. The output of the amplifier 113, $IES_{LIM}$, is connected to the peak detectors 114-117 respectively providing values $V_{PL,LIMP}$, $V_{PH,LIMP}$, $V_{PL,LIMQ}$ and $V_{PH,LIMQ}$ which mirror peak detectors 109-112. In the present embodiment the $V_{PL,LIMP}$, $V_{PH,LIMP}$, $V_{PL,LIMQ}$ and $V_{PH,LIMQ}$ values are arranged as input in feedback loops implemented by the comparator setup 118 and the up/down counters 119 and 120. The two feedback loops are arranged to adjust the threshold $V_{REF}$ and the output swing of the amplifier 113 so that the difference in logic-high of the non-inverted signal on either side of the amplifier 113 is substantially equal to the difference in logic-high of the inverted signal. By way of the limiting amplifier 113 and the referencing of the output of the peak detectors on either side of this amplifier the pattern dependency of the peak detectors will at least to some extent cancel out. In an embodiment other signal parameters are applied instead of one or more of the peak detectors shown here as long as the degrees of freedom in the signal can be resolved. In an embodiment two signal parameters from each side of the reference stage are sufficient such as two values selected from average, modulation amplitude, $P_H$, $P_L$.

It is noted that this embodiment does not necessarily measure the modulation index as it may be sufficient to set AmpRef to a level where second signals will have an IES in the linear regime of the amplifier 103. However, in an embodiment the receiver comprises a controller for adjusting AmpRef for example using the adjustment by the counter 119 as input as the setting of the amplifier 113 by the feedback loop provides an indicator of the modulation amplitude of the signal. The peak detector outputs (e.g. 109,110) may also be applied but, depending on the design, the peak detectors may introduce pattern dependency in the determination of the modulation amplitude.

In an embodiment the peak detectors 109-112, 114-117 have a bandwidth so that they average over the toggling signal. This may provide for a more stable receiver with relatively little activity in the feedback loops for constant signal characteristics. In an embodiment the peak detectors 109-112, 114-117 have a bandwidth so that they follow the toggling signal. This may in an embodiment provide for a receiver which responds faster to changes in the optical signal.

The receiver further comprises circuitry for regenerating the binary content. In an embodiment the output of the limiting amplifier 13 is applied for that purpose followed by signal conditioning and an output driver for relaying the binary content as an electrical binary signal.

FIG. 2 shows the receiver of FIG. 1 in a mode suitable for receiving a signal that is a long series of CIDs or sufficiently dominated by one logic value that the other value is not sufficiently well detected by the respective peak detectors to set a reliable threshold. As an example, the following discussion assumes that a long series of logic-low is received. The connection 201 connecting a clock signal to the up/down counter 119 is interrupted in this mode resulting in a constant output swing of the limiting amplifier 113. The toggling amplitude is detectable via the diode 105b connected to the inverted output of the amplifier 103. As substantially only logic-low is received only peak detectors 109,112,114 and 117 will likely provide a useful signal and the output of the limiting amplifier 113 will be constant LIMP and LIMQ on the non-inverted and inverted outputs, respectively. The inverted output will be at logic-high, so that the CID sign detector 202 will set the switch 3 so the values from peak detectors 109,112,114 and 117 are used to adjust the threshold $V_{REF}$. The output from the peak detectors is compared so that the up/down counter 120 adjusts the threshold so that the modulation amplitude out of the amplifier 103 equals that of 113. In the event that characteristics of the incoming signal changes corresponding changes in the toggling amplitude will ensure adjustment of the gain of the transimpedance amplifier via the full-wave rectifier 103,105 and the circuits 106,107,108. A change in offset relative to $V_{REF}$ will be adjusted by the up/down counter 120, so a viable threshold is maintained even when receiving a long series of CIDs.

In an embodiment the up/down counter 119 is not disabled but instead connected to the same comparator 204 or 205 as the up/down counter 120. This may for example be preferable for a receiver where the peak detectors 109-112, 114-117 are fast enough to resolve the toggling signal.

Figure 3:
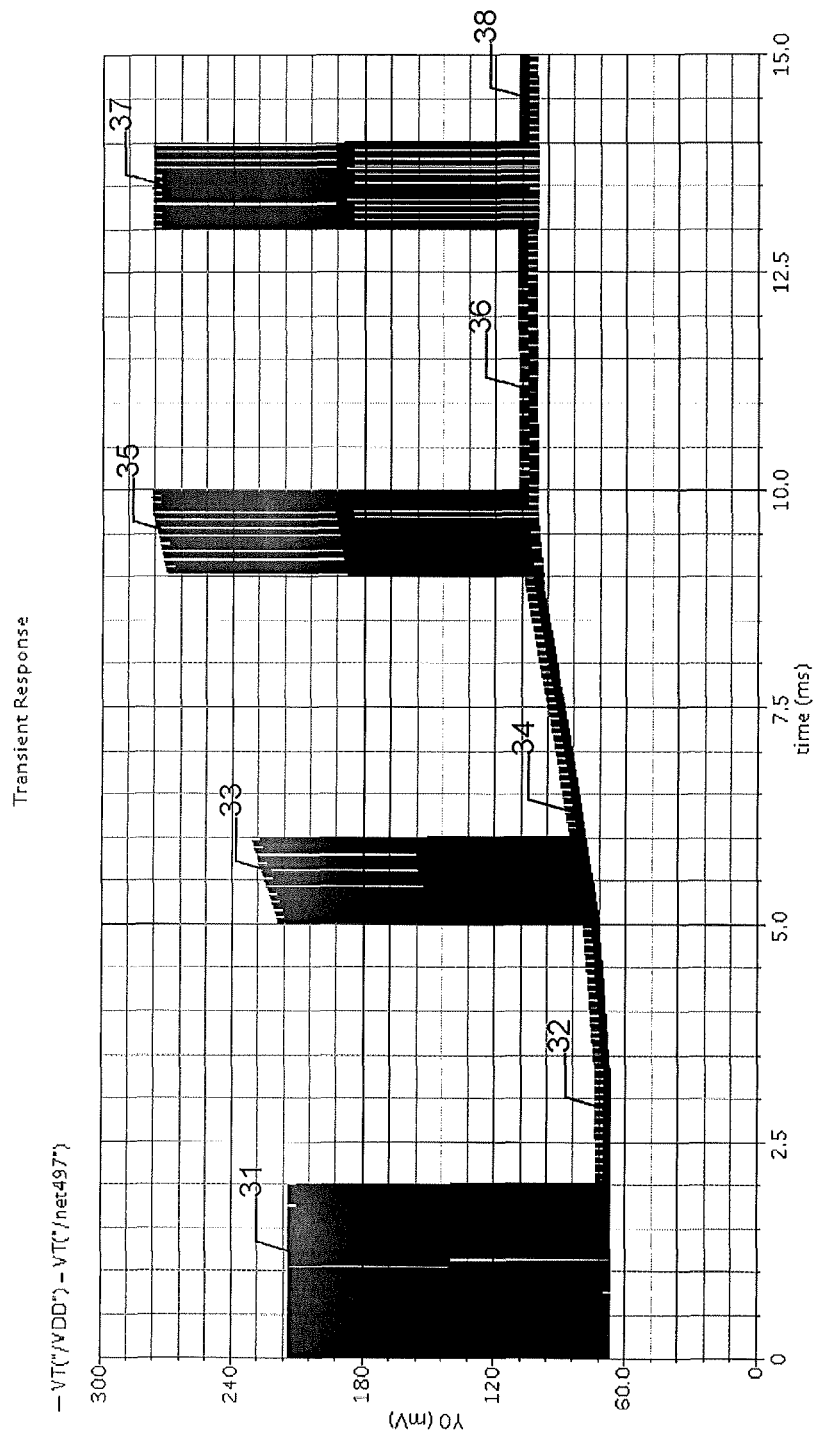
FIG. 3 shows a simulated signal electrical input signal to the receiver of FIGS. 1 & 2.
Figure 4:
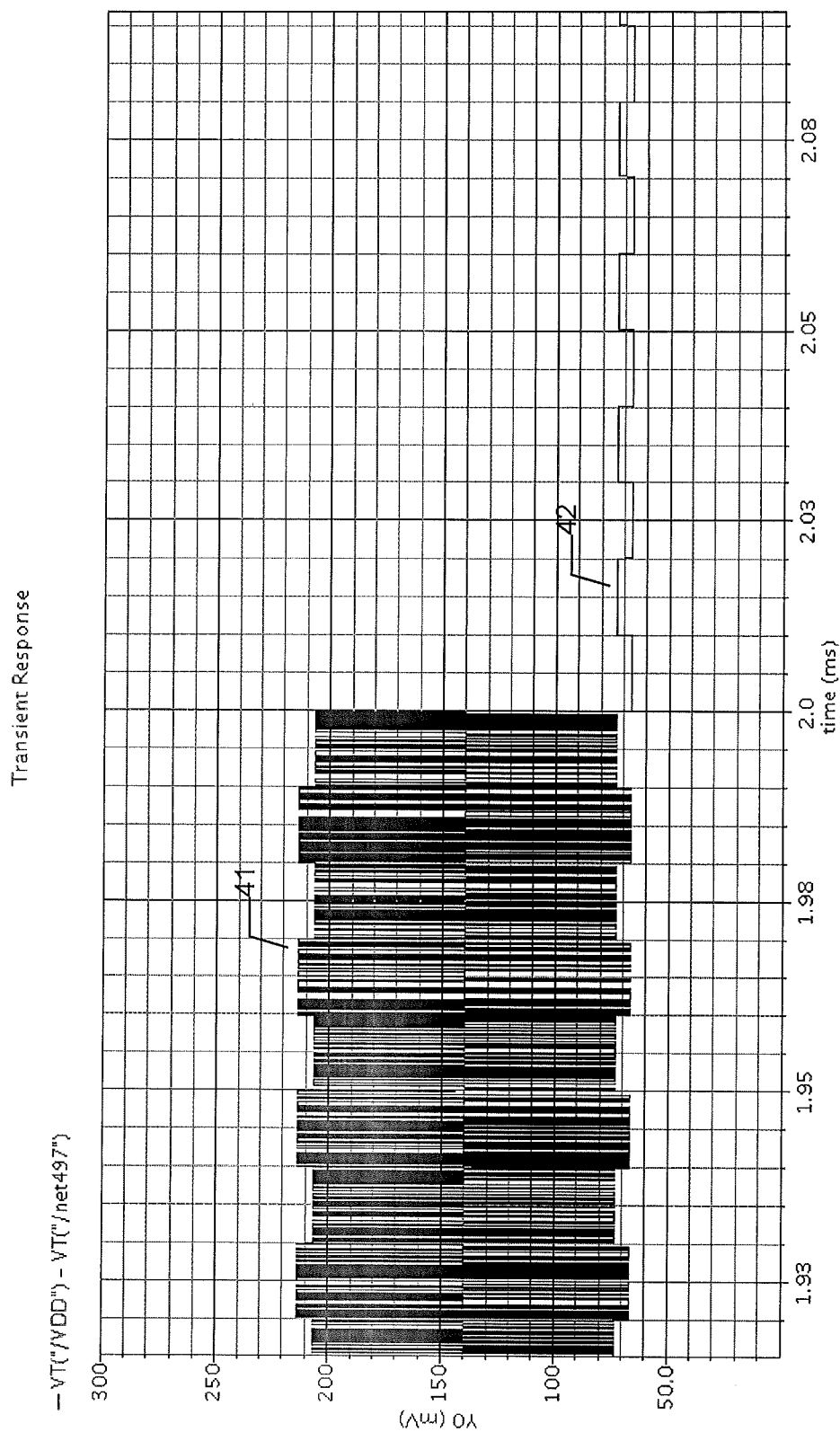
FIG. 4 shows a close up of the signal shown in FIG. 3.

FIGS. 3-6 show results of simulations of the receiver of FIGS. 1 and 2. The units on the y-axis are arbitrary and relate to specificities of the simulation. FIG. 3 shows an simulated input signal (i.e. output of the photodiode 101) comprising sections 31, 33, 35, 37 of active binary signal (single bits are indistinguishable) and long series of CIDs 32, 34, 36 and 38. During periods 32-35 the modulation amplitude and logic-low is changed. During periods of CIDs (32,34,36,38) the toggling signal is clearly identified as a broadening of the signal. FIG. 4 shows a subsection of the input signal where sections 41 and 42 correspond to parts of the sections 31 and

32. In section 41 the modulation amplitude toggles between about 130 units and about 150 units symmetrically about Y0=140 i.e. with average modulation amplitude of about 140 units. The toggling signal is identifiable as binary signal with amplitude of about 10 units which modulates the modulation amplitude, so the modulation index is in this case 10/140≈7%. Section 42 shows how the logic low value is modulated by the substantially binary toggling signal with amplitude of about 5 units.

Figure 5:
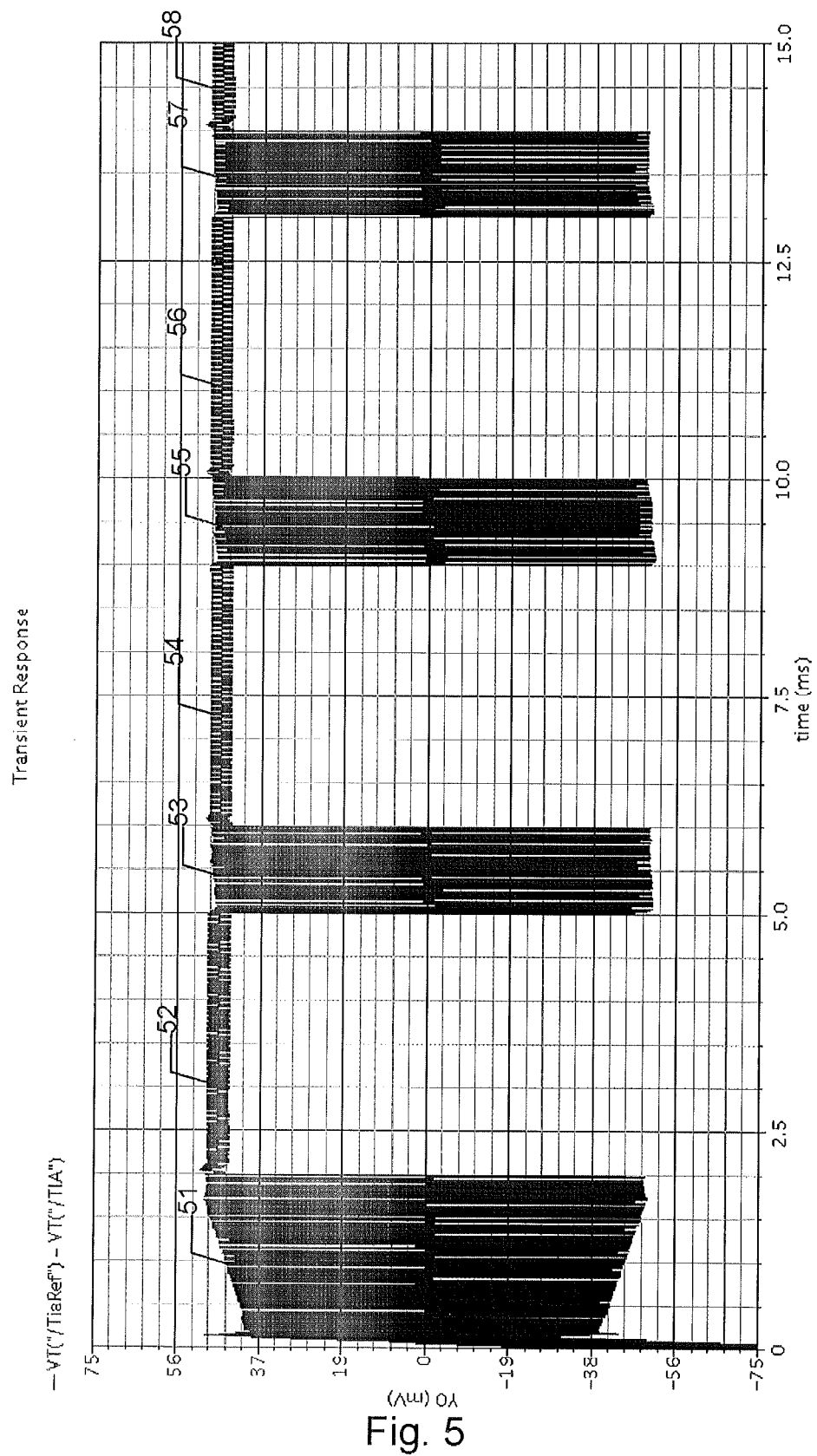
FIG. 5 shows the output of the non-limiting amplifier 103 of the signal of FIG. 3
Figure 6:
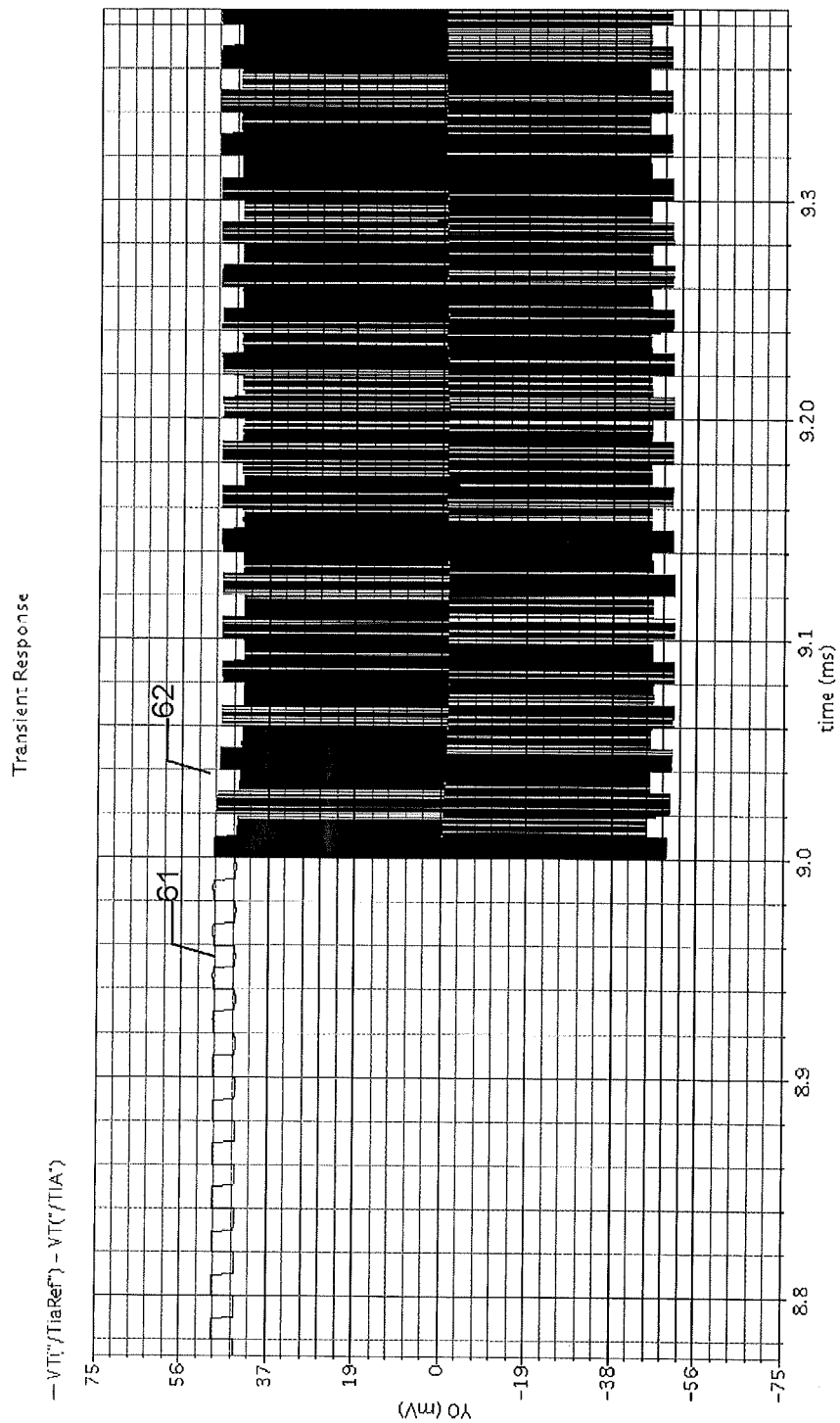
FIG. 6 shows a close up of the signal of FIG. 5.

FIG. 5 shows the output from the non-limiting amplifier 103. During the first 2 ms of section 51 the feedback loops settle and the receiver initialization may be said to be complete. The threshold settles relatively quickly close to zero whereas the modulation amplitude settles at a slower rate. It is notable that the regenerated signal is substantially constant through the periods 52-55 corresponding to the periods 32-35 where the characteristics of the input signal change. Accordingly, the example demonstrates the capability of the receiver incorporating the invention to set a suitable threshold even during long periods of CIDs and to compensate for changes in the input signal.

Figure 7:
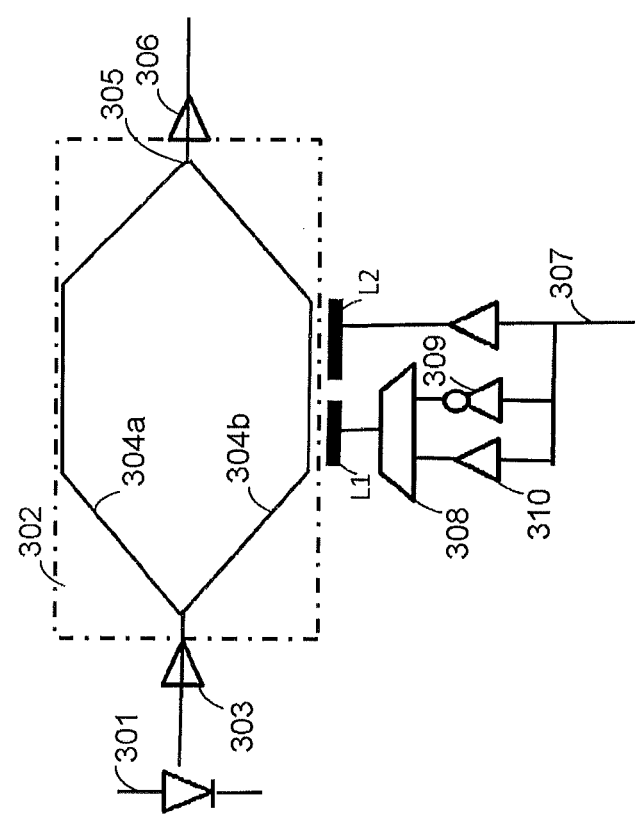
FIG. 7 is a schematic illustration of a transmitter.

FIG. 7 shows an optical transmitter driver circuit comprising a light source 301 and a waveguide 302. The light source-waveguide configuration is known as a Maeh-Zender Modulator. The light source is emitting light. The emitted light is coupled into the waveguide 302 via a coupler 303. In the waveguide 302 the light is separated into a first and a second branch 304a and 304b. The first branch 304a is transmitting the light directly through the waveguide 302 to a merging region 305. The second branch 304b is transmitting the light with a modulated delay through the waveguide 302 to the merging region 305.

The modulated delay is obtained by subjecting the second branch to a power provided by a modulated voltage via electrodes L1, L2. The electrodes L1, L2 are electrically connected to be supplied with respectively the binary signal (indicated with 307) and the toggling signal supplied from sub-band modulator 308. Each of the electrodes L1, L2 is arranged such that light transferred in the second branch 304b is delayed when voltage is applied to one or both electrodes. The sum of the applied voltage determines the delay of the time and thereby the resulting light intensity, which due to the modulating of the voltage is modulated accordingly.

The electrode L1 is regulated by the binary input signal 307 and the electrode L2 provides the toggling signal from sub-band modulator 308.

The modulating index can be determined as L1/L2.

The sub-band modulator 308 is electrically connected to receive the binary signal 307 as input via inverter 309 inverting the signal or non-inverter 310 not inverting signal. The inverter and non-inverter can independently of each other e.g. simultaneously amplify or limit the respective signal. The sub-band modulator 308 regulates the toggling signal by switching between applying the inverted signal and applying the non-inverted signal.

In the merging region 305 the light from the first and the second branch 304a and 304b is merged to obtain the modulated binary optical signal. Due to the delay of the light in the second branch 304b, the delayed light will be out of phase with light in one or more other branches where the light has not been delayed or where it has bee delayed to a different degree. The delayed light will therefore when merged with light from one or more other branches, therefore more or less extinguish the light, and since the light is delayed in a modulated fashion, the resulting light will in a similar way be modulated with respect to light intensity.

The modulated binary optical signal is send further via output coupler 306 to be transmitted.

Figure 8:
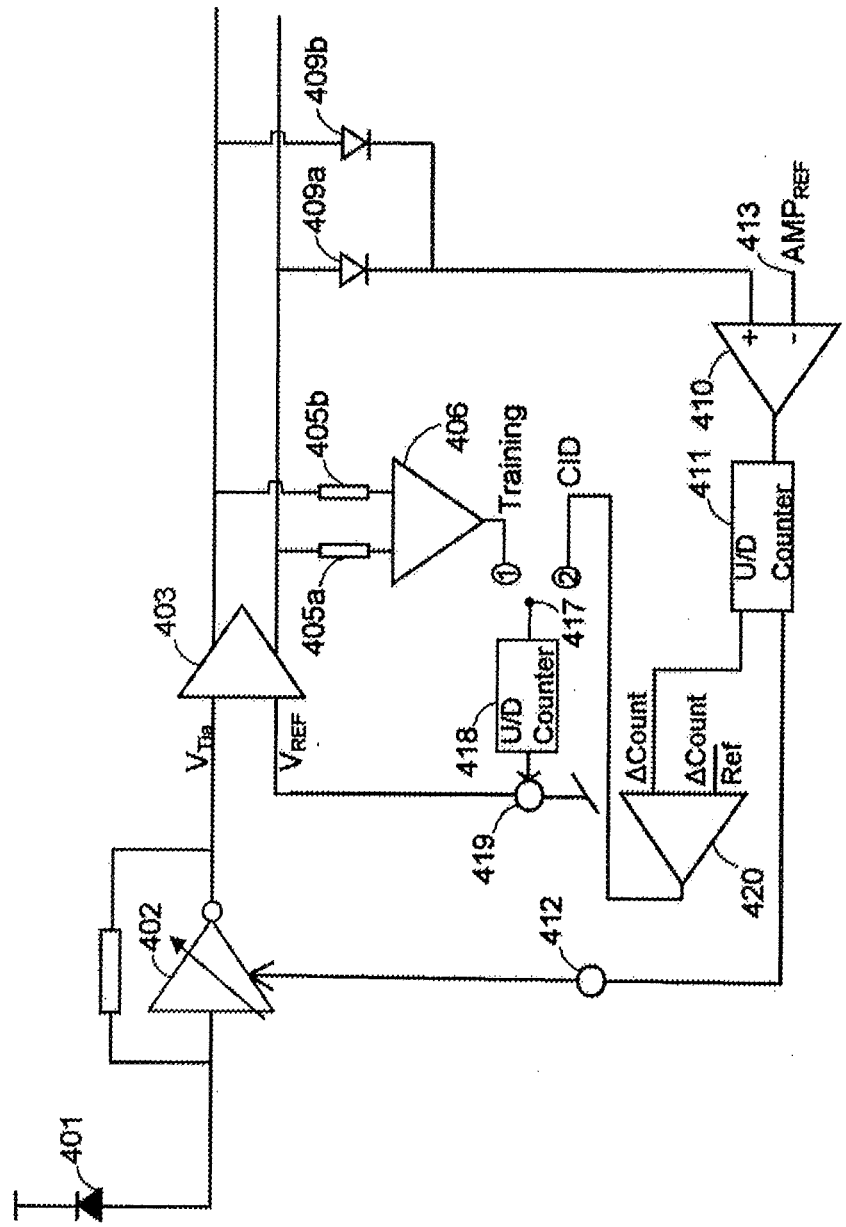
FIG. 8 is a schematic illustration of a receiver according to the invention where the receiver can operate in a training mode and in an operating mode suitable for a long series of CIDs.

FIG. 8 is a schematic illustration of a receiver according to the invention which receiver can operate in a training mode and in an operating mode suitable for a long series of CIDs. The receiver is advantageously configured to operate in the training mode when the binary content of the IES signal relatively, and advantageously number of logic high and logic low is relatively equal. When the binary content comprises a long series of CIDs, the receiver advantageously switches to operating mode The activity detector is not shown and the TAC is partially shown, but circuitry controlling the mode of the receiver is not shown.

The receiver circuit is connected to a photo diode 401 for receiving the binary optical signal and converting it into a current which is converted to voltage $V_{TIA}$ via the transimpedance amplifier 402. Here $V_{TIA}$ may be seen as the intermediate electrical signal (IES) discussed above, which in this embodiment is input to the differential amplifier 403 and the decision threshold $V_{REF}$ is the other input. The differential amplifier 403 may be as described in FIGS. 1 and 2. The outputs of the differential amplifier 403 are connected to diodes 409a and 409b connected to the non-inverted input of the error amplifier 410. The inverted input to the error amplifier is a reference voltage 413—which may advantageously be adjusted manually. The output of 410 is via the up/down counter 411 and the DAC 412 connected to the gain control input of the transimpedance amplifier. Thereby this circuit automatically controls the voltage swing on the output of 403 so that the voltage swing is constant and controlled by the reference voltage 413.

The differential amplifier 403 is also connected to the error amplifier 406 via the resistors 405a and 405b. In the training mode the switch 417 is connecting the output of 406 to the reference input of the amplifier 403 e.g. via the up/down counter 418 and the DAC 419. In this mode the circuit operates like a conventional DC restoration circuit with the threshold being the reference input of the differential amplifier 403.

If the EIS signal has the properties described above the up down counter 411 will count up and down as a function of the second toggling amplitude and the difference between the highest count and the lowest count will be a measure for the toggling amplitude. This difference is measured and stored for reference later when the receiver is in an operating mode suitable for receiving long series of CID.

In the operating mode suitable for receiving long series of CID, the switch 417 connects the output of the error amplifier 420 with the up/down counter 411. The error amplifier 420 compares the actual measured difference between the highest count and the lowest count for 411 with the stored value from the training mode and controls the up/down counter 411 accordingly. Thereby the reference to the differential amplifier 403 will be equal to the threshold for the signal VTIA—which constitutes the EIS signal even during long periods of CID.

In this way a feedback loop is formed arranged to maintain constant toggling amplitude. If the modulation index from the receiver is constant the modulation amplitude of the IES will hence also be maintained substantial constant.

From the foregoing general discussion of the invention and the example of figures it is clear that the invention may be implemented in many ways. The above example should therefore be considered an example demonstrating specific implementations of the different components of the receiver, e.g. circuit arranged for measuring the second toggling amplitude and circuit for measuring values relating to logic-low and logic-high in the signal. As will be clear to a skilled person such implementations of one function may be combined with other embodiments of other functions without departing from the scope of the invention. For example, the receiver may in one example be implemented applying the decision threshold, $V_{REF}$, as one input to a limiting amplifier and $V_{TIA}$ as the other as it is common in many prior arts receivers. In one such embodiment the limiting amplifiers have a single ended output. Similar to FIG. 1, $V_{REF}$, and the output swing of the limiting amplifier may be adjusted via feedback loops comparing signal parameters on both sides of the limiting amplifier. The receiver further comprises circuitry for measuring the toggling amplitude, the output of which is arranged to adjust the gain of the transimpedance stage similarly to the receiver of FIG. 1.

The invention claimed is:

1. A method for optical transmission of an optical signal comprising a binary content comprising
   transmitting the optical signal with the binary content comprising a first logic-high and a first logic-low defining a first modulation amplitude wherein the first modulation amplitude is sub-band modulated with a toggling signal having a first toggling amplitude with a first modulation index relative to said first modulation amplitude,
   receiving said optical signal with an optical receiver circuit and converting the optical signal to an intermediate electrical signal, IES, said IES having the following parameters:
   i. a second logic-high and a second logic-low defining a second modulation amplitude and
   ii. a second toggling amplitude having a second modulation index relative to said second modulation amplitude,
   providing a decision threshold relative to said IES as a function of said second modulation amplitude, and
   adjusting the decision threshold by determine the second toggling amplitude and adjusting said decision threshold relative to said IES based on proportionality between the second toggling amplitude and said second modulation amplitude.

2. The method of claim 1 wherein said method comprises determine at least one of the following values
   a $P_H$ value related to the second logic-high,
   a $P_L$ value related to the second logic-low, and
   a MA value related to the second modulation amplitude and determining the validity of said measured values.

3. The method of claim 2 comprising adjusting said decision threshold based on one or more of said determined values when said determined values are determined to be valid.

4. The method of claim 3 wherein a change in $P_L$ or $P_H$ relative to the other value or an average value of the IES indicates that said $P_L$ or $P_H$ is invalid.

5. The method of claim 3 wherein a rate of change in $P_L$ or $P_H$ indicates that said $P_L$ or $P_H$ is invalid.

6. The method of claim 3 wherein the validity of said present $P_L$ or $P_H$ value is determined by a Threshold Adjustment Circuit (TAC) from one or more of the following parameters: the rate of chance in said $P_L$ or $P_H$, the relative change in said $P_L$ or $P_H$, the deviation between AVG and a threshold, one or more indicator values obtained via an activity detector, and the domination of the other value said $P_L$ or $P_H$ where $P_H$ and $P_L$.

7. The method of claim 6 wherein said indicator values obtained via said activity detector, optionally in combination with said AVG or said threshold, allow the Threshold Adjustment Circuit (TAC) to determine a state of the signal.

8. The method of claim 7 wherein said states comprise two or more of the following possibilities:
   High activity
   Medium activity
   Low activity.

9. The method of claim 8 where a state of high activity causes said TAC to perform at least one of the following
   determining the DC balance of the signal by determining a deviation between AVG and $TH_P$, and adding suitable offset values to $P_L$ and/or $P_H$ optionally depending on said deviation,
   setting the threshold according to the method applied during medium activity, or
   maintaining constant value of said threshold.

10. The method of claim 2 wherein the determination of the second modulation or the second modulation index comprises the use of at least one peak detector.

11. The method of claim 10 where said peak detector comprises a difference amplifier with a bandwidth $BW_P$ having a cut off frequency corresponding to the time period of one half bit or more, such as 1 bit or more, such as 2 bits or more, such as equal to 3 bits or more, such as equal to 4 bits or more, such as equal to 5 bits or more, such as equal to 10 bits or more, such as equal to 20 bits or more.

12. The method of claim 10 where said peak detector comprises a hold and/or reset function.

13. The method of claim 10 where said peak detector has a characteristic discharge time corresponding to the time span of 1 bit or more, such as 2 bits or more, such as equal to 3 bits or more, such as equal to 4 bits or more, such as equal to 5 bits or more, such as equal to 10 bits or more, such as equal to 20 bits or more, such as equal to 30 bits or more, such as equal to 40 bits or more, such as equal to 50 bits or more, such as equal to 100 bits or more, such as equal to $10^3$ bits or more, such as equal to $10^4$ bits or more.

14. The method of claim 2 comprising determining the second modulation index and subsequently adjusting said decision threshold based on
   a determination of the second toggling amplitude and
   the previously determined modulation index.

15. The method of claim 2 comprising determining said second modulation index and when said determined value is determined to be valid and when at least one of $P_H$, $P_L$ and MA is determined to be invalid, adjusting said decision threshold based on
   a determination of the second toggling amplitude and
   its proportionality with the second modulation amplitude.

16. The method of claim 2 wherein at least one of the $P_H$ value or the MA is determined to be invalid in the event that more than 50% of the current signal over a time period longer than or equal to $10^4$ bits immediately after determining the $P_H$ value has low values relative to the TAC the bits.

17. The method of claim 2 wherein at last one of the $P_L$ or the MA value is determined to be invalid in the event that more than 50% of the current signal over a time period longer than or equal to $10^4$ bits immediately after determining the $P_L$ value has low values relative to the TAC.

18. The method of claim 1 comprising setting the second modulation index as a predetermined value and adjusting said decision threshold based on a determination of the second toggling amplitude.

19. The method of claim 1 comprising adjusting a gain in said receiver circuit so that the second toggling amplitude is held substantially constant.

20. The method of claim 1 further comprising amplifying said IES thereby adjusting said second modulation amplitude and second toggling amplitude.

21. The method of claim 1 wherein the setting of said threshold as a fraction of said second modulation amplitude is based on an average (AVG) of the IES.

22. The method of claim 1 further comprising
applying a limiting amplifier, said limiting amplifier having said threshold as one input and said IES as a second input and a limited version of IES, $IES_{LIM}$, as output,
measuring at least one signal parameter of IES and at least one corresponding signal parameter of $IES_{LIM}$
employing a feedback loop to adjust said threshold based on the difference between the measured signal parameter of IES and $IES_{LIM}$ as an error signal.

23. The method of claim 22 further comprising determining a second signal parameter of IES and a second corresponding signal parameter of $IES_{LIM}$, and employing a feedback loop to adjust the modulation amplitude of $IES_{LIM}$ or IES based on the difference between the measured second signal parameter of IES and $IES_{LIM}$ as an error signal.

24. The method of claim 22 wherein said signal parameter is selected from $P_H$, $P_L$ and MA from IES.

25. The method of claim 1 further comprising
applying a linear differential amplifier, said differential amplifier having said threshold as one input and said IES or a derivative thereof as a second input and a differential version of IES, $IES_{DIFF}$, as output,
applying a limiting differential amplifier having $IES_{DIFF}$ as input and $IES_{LIM}$ as output,
measuring at least one signal parameter of $IES_{DIFF}$ and at least one corresponding signal parameter of $IES_{LIM}$
employing a feedback loop to adjust said threshold based on the difference between the measured signal parameter of $IES_{DIFF}$ and $IES_{LIM}$ as an error signal.

26. The method of claim 25 further comprising measuring a second signal parameter of IES and a second corresponding signal parameter of $IES_{LIM}$, and employing a feedback loop to adjust the modulation amplitude of $IES_{LIM}$ or $IES_{DIFF}$ based on the difference between the measured second signal parameter of $IES_{DIFF}$ and $IES_{LIM}$ as an error signal.

27. The method of claim 25 wherein said signal parameter is selected from $P_H$, $P_L$ and MA from IES.

28. The method of claim 1 further comprising applying an activity detector to indicate the activity in the electrical signal to obtain an indicator value for one or more of the following:
number of transitions between logic high and logic low within a predetermined time period,
number of incidences of CIDs of logic high and/or logic low value longer than a predetermined length over a predetermined time period.

29. The method of claim 1 wherein said binary content of said optical signal comprises long series of CIDs.

30. The method of claim 29 wherein the length of a series of CIDs of logic-high or logic-low is determined disregarding series of CIDs of the other logic value shorter than a minimum length, such as shorter than or equal to 3 bits.

31. The method of claim 30 wherein a long series of CIDs is a period wherein two or more of $P_H$, $P_L$ and MA is determined to be invalid.

32. The method of claim 29 wherein a long series of CIDs is a period wherein at least one of $P_H$, $P_L$ and MA is determined to be invalid.

33. The method of claim 1 comprising applying an activity detector in said receiver circuit to determine whether said binary optical signal comprises long CIDs.

34. The method of claim 1 wherein a calculated threshold is compared to the average of the electrical signal to determine the validity of $P_L$ or $P_H$ such as a threshold calculated as $(P_L+P_H)/x$, where $P_H$ and $P_L$ are optionally adjusted for an offset relative to said binary electrical signal.

35. The method of claim 1 where a substantial deviation between an average of the IES, AVG, and a calculated threshold, $TH_P$, indicates that either $P_L$ or $P_H$ is invalid, so that
a. when $AVG>TH_P$ then $P_L$ is deemed invalid and
b. when $AVG<TH_P$ then $P_H$ is deemed invalid.

36. The method of claim 35 where a substantial deviation calculated as $$100\% \cdot \left|2\frac{AVG - TH_P}{P_H - P_L}\right|$$

is larger man or equal to 5%.

37. The method of claim 1 further comprising converting said IES in said receiver circuit into a binary electrical signal output downstream of said input via said decision threshold.

38. The method of claim 1 wherein said binary content of said optical signal has a bit frequency and said toggling signal has a center frequency of less than 10% of said bit frequency, such as less than 5% of said bit frequency, such as less than 2.5% of said of said bit frequency, such as less than 1% of said bit frequency, such as less than 0.5% of said bit frequency, such as less than 0.1% of said bit frequency, such as less than 0.01% of said bit frequency.

39. The method of claim 1 wherein said modulation amplitude is determined as an average value over a period of said toggling signal.

40. The method of claim 1 wherein said modulation index is defined as the ratio of said toggling signal relative to an average value of said modulation amplitude over a period of said toggling signal.

41. The method of claim 1 wherein said signal has a bit frequency larger than 100 Mbit, such as larger than or equal to 1 Gbit, such as larger than or equal to 10 Gbit, such as larger than or equal to 25 Gbit, such as larger than or equal to 50 Gbit, such as larger than or equal to 100 Gbit.

42. The method of claim 1 wherein said threshold is updated by adjusting one or more of
a shunt current source suitable for shunting part of the current from the photo detector,
an offset for an amplifier, such as an amplifier converting a current from the photo detector to a voltage, and
the threshold for a decision circuit, such as a limiting amplifier.

43. The method of claim 1 wherein determination of said second toggling amplitude comprises the use of a full wave rectifier circuit.

44. The method of claim 43 wherein said full wave rectifier circuit comprises differential amplifier having said decision threshold as one input.

45. The method of claim 44 wherein said differential amplifier is a linear amplifier.

46. The method of claim 1 wherein the values $P_L$ and $P_H$ are obtained relative to a threshold value.

47. An optical receiver circuit for receiving an optical signal with a binary content and converting it to an intermediate electrical signal, IES, with a binary content comprising
a second logic-high and a second logic-low defining a second modulation amplitude, and
a sub-band modulation of said second modulation amplitude having a toggling amplitude,
the optical receiver comprising a circuit arranged to measure an toggling amplitude of said second toggling signal, and a circuit arranged to adjust said decision threshold based on the second toggling amplitude.

48. The circuit of claim 47 further comprising a full wave rectifier circuit having a decision threshold as one input.

49. The circuit of claim 48 wherein said full wave rectifier comprises a differential amplifier having said decision threshold as one input and said voltage signal as another input.

50. The circuit of claim 47 further comprising a feedback loop arranged to maintain substantial constant toggling amplitude.

51. The circuit of claim 47 further comprising a peak detector for determine a value relating to the second logic-low and/or the second logic-high level of said voltage signal.

52. The circuit of claim 47 wherein said circuit arranged to determine the toggling amplitude comprises a full wave rectifier circuit.

53. The circuit of claim 47 further comprising circuitry for implementing the method of optical transmission of an optical signal comprising a binary content comprising transmitting the optical signal with the binary content comprising a first logic-high and a first logic-low defining a first modulation amplitude wherein the first modulation amplitude is sub-band modulated with a toggling signal having a first toggling amplitude with a first modulation index relative to said first modulation amplitude, receiving said optical signal with an optical receiver circuit and converting the optical signal to an intermediate electrical signal, IES, said IES having the following parameters:
   iii. a second logic-high and a second logic-low defining a second modulation amplitude and
   iv. a second toggling amplitude having a second modulation index relative to said second modulation amplitude, providing a decision threshold relative to said IES as a function of said second modulation amplitude, and adjusting the decision threshold by determine the second toggling amplitude and adjusting said decision threshold relative to said IES based on proportionality between the second toggling amplitude and said second modulation amplitude.

54. An optical receiver comprising a receiver circuit according to claim 47 connected to a photodiode.

* * * * *